United States Patent
Pingenot

(10) Patent No.: US 9,451,002 B2
(45) Date of Patent: Sep. 20, 2016

(54) DISTRIBUTED STREAM PROCESSING

(71) Applicant: SAS Institute Inc., Cary, NC (US)

(72) Inventor: Joseph Albert F. S. Pingenot, Fuquay Varina, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 14/828,260

(22) Filed: Aug. 17, 2015

(65) Prior Publication Data

US 2016/0044074 A1   Feb. 11, 2016

Related U.S. Application Data

(63) Continuation of application No. 14/820,876, filed on Aug. 7, 2015.

(60) Provisional application No. 62/035,189, filed on Aug. 8, 2014.

(51) Int. Cl.
G06F 15/16 (2006.01)
*H04L 29/06* (2006.01)
*H04L 29/08* (2006.01)

(52) U.S. Cl.
CPC ............ *H04L 65/604* (2013.01); *H04L 63/08* (2013.01); *H04L 65/1069* (2013.01); *H04L 65/4069* (2013.01); *H04L 67/1095* (2013.01)

(58) Field of Classification Search
None
See application file for complete search history.

(56) References Cited

U.S. PATENT DOCUMENTS

| | | | |
|---|---|---|---|
| 2002/0085496 A1* | 7/2002 | Jamp | H04L 47/10 370/235 |
| 2003/0163618 A1* | 8/2003 | Anand | H04L 47/621 710/52 |
| 2005/0025151 A1* | 2/2005 | Marce | H04L 45/02 370/392 |
| 2008/0231684 A1* | 9/2008 | Underwood | H04N 7/147 348/14.01 |
| 2010/0095107 A1* | 4/2010 | Smith | H04L 12/2803 713/150 |
| 2012/0114311 A1* | 5/2012 | Sutherland | G11B 20/10527 386/292 |
| 2014/0059238 A1* | 2/2014 | Mela | H04L 29/06027 709/227 |
| 2014/0173018 A1* | 6/2014 | Westphal | H04L 41/0823 709/213 |

* cited by examiner

*Primary Examiner* — Joshua Joo
(74) *Attorney, Agent, or Firm* — Bell & Manning, LLC

(57) ABSTRACT

A regularizer process is started by a first thread executing at a computing device. The regularizer process is a separate process from a process executing on the first thread. The started regularizer process sends a presence announcement to a controller device and receives a presence acknowledgement from the controller device. The started regularizer process sends a notification to the first thread that it is ready to receive streamed data. The started regularizer process receives, from the controller device, an indicator of a data provider system that is to connect to it, receives a connection request from the data provider system, compares the received connection request to the received indicator, sends a connection acknowledgement to the data provider system when the received connection request matches the received indicator, accepts a connection from the data provider system, and receives the streamed data through the connection.

30 Claims, 24 Drawing Sheets

DISTRIBUTED STREAM PROCESSING

CROSS-REFERENCE TO RELATED APPLICATIONS

The present application is a continuation of U.S. patent application Ser. No. 14/820,876 that was filed Aug. 7, 2015, the entire contents of which are hereby incorporated by reference. The present application claims the benefit of 35 U.S.C. §119(e) to U.S. Provisional Patent Application No. 62/035,189 filed Aug. 8, 2014, the entire contents of which are hereby incorporated herein by reference.

BACKGROUND

An increasing number of distributed applications process continuously flowing data from geographically distributed sources, perform analytics on the streamed data, and provide analysis results to entities that may also be geographically distributed.

SUMMARY

In an example embodiment, a computer-readable medium is provided having stored thereon computer-readable instructions that when executed by a computing device, cause the computing device to support distributed stream processing. A regularizer process is started by a first thread executing at the computing device. The regularizer process is a separate process from a process executing on the first thread. The started regularizer process sends a presence announcement to a controller device. The presence announcement includes an indicator of the computing device. The controller device controls distribution of analytic results to a data access system. The analytic results are computed from streamed data. The started regularizer process receives a presence acknowledgement from the controller device in response to sending the presence announcement. The started regularizer process sends a notification to the first thread executing at the computing device that the started regularizer process is ready to receive the streamed data after receiving the presence acknowledgement. The started regularizer process receives, from the controller device, an indicator of a data provider system that is to connect to the started regularizer process after sending the notification. The started regularizer process receives a connection request from the data provider system. The started regularizer process compares the received connection request to the received indicator. The started regularizer process sends a connection acknowledgement to the data provider system when the received connection request matches the received indicator. The started regularizer process accepts a connection from the data provider system. The started regularizer process receives the streamed data through the connection.

In another example embodiment, a system is provided. The system includes, but is not limited to, a processor and a computer-readable medium operably coupled to the processor. The computer-readable medium has instructions stored thereon that, when executed by the processor, cause the system to support distributed stream processing.

In yet another example embodiment, a method of supporting distributed stream processing is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
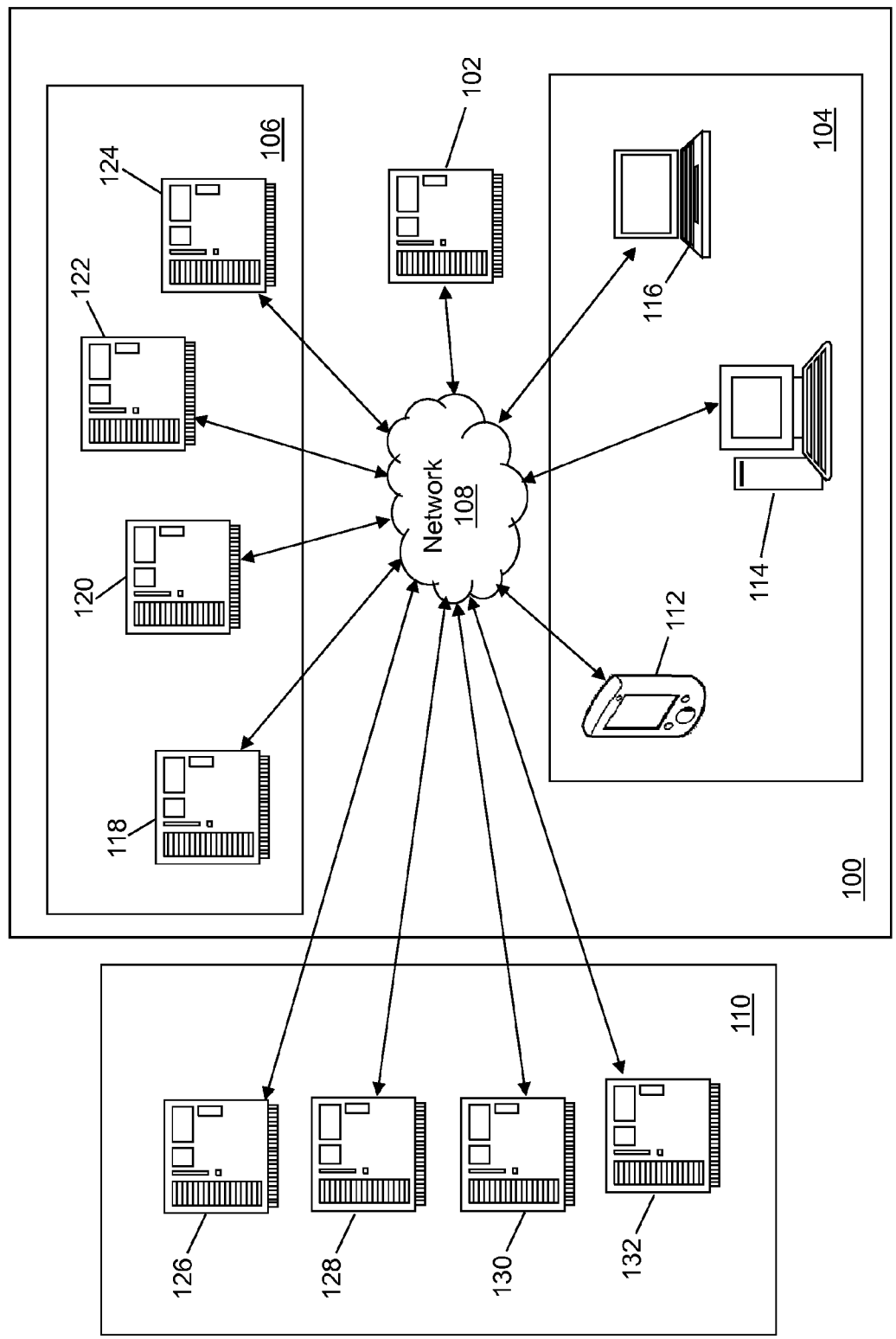
FIG. 1 depicts a block diagram of a stream processing system in accordance with an illustrative embodiment.

Referring to FIG. 1, a block diagram of a stream processing system 100 is shown in accordance with an illustrative embodiment. In an illustrative embodiment, stream processing system 100 may include a controller device 102, data access systems 104, a plurality of stream nodes 106, and a network 108. A plurality of data provider systems 110 provide streamed data to stream processing system 100. Stream processing system 100 receives the streamed data, performs analytic processing on the streamed data, and provides analytic results to data access systems 104.

For example, the streamed data sent from the plurality of data provider systems 110 may be generated by a sensor, may be generated or captured in response to occurrence of an event or a transaction such as a sale of a product or a service, may be generated by a device such as in response to an interaction by a user with the device, etc. As used herein, the streamed data may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

Each of controller device 102, data access systems 104, and the plurality of stream nodes 106 may be composed of one or more discrete devices in communication through network 108. For example, the plurality of stream nodes 106 may implemented as a series of blades as understood by a person of skill in the art. The plurality of stream nodes 106 and controller device 102 may communicate using a message passing interface (MPI), which is a language-independent communications protocol that may be used to program communication between parallel computers such as the plurality of stream nodes 106. Either or both of point-to-point and collective communication may be supported by the MPI. The plurality of stream nodes 106 and controller device 102 may be configured similarly in terms of both software and hardware though this may or may not be required.

Controller device 102 may provide authentication so that the plurality of stream nodes 106 accept streams of data from the plurality of data provider systems 110 and may provide distribution and coordination of the workload distributed between the plurality of stream nodes 106. Requests sent to controller device 102 from one or more of the data access systems 104 are distributed to the plurality of stream nodes 106 as part of the distribution and coordination of the workload. The plurality of stream nodes 106 perform an analytic task on the streamed data that is stored in memory on the respective computing device and return the results to controller device 102. Controller device 102 may provide additional analytic processing on the returned results before sending the returned results to a requesting device of the data access systems 104. For example, the additional analytic processing by controller device 102 may assemble a final statistical result from partial results generated by one or more of the plurality of stream nodes 106. The returned results may be sent to the requesting device of the data access systems 104 in a controlled results stream. Controller device 102 may provide analytic processing in a manner similar to that and possibly in coordination with that provided by the SAS® LASR™ Analytic Server developed and provided by SAS Institute Inc. of Cary, N.C., USA. The SAS® LASR™ Analytic Server is a distributed in-memory computing system with co-located memory and storage. The entire contents of U.S. Pat. No. 8,271,537 assigned to SAS Institute Inc. of Cary, N.C., USA are hereby incorporated herein by reference. Other distributed in-memory computing systems with co-located memory and storage may be used. Controller device 102 also may provide analytic processing in a manner similar to that and possibly in coordination with that described in U.S. patent application Ser. Nos. 14/747,763 and 14/747,965, both of which were filed Jun. 23, 2015, and assigned to SAS Institute Inc. of Cary, N.C., USA. The entire contents of U.S. patent application Ser. Nos. 14/747,763 and 14/747,965 are hereby incorporated herein by reference.

The plurality of stream nodes 106 may further provide privilege separation between controller device 102 and the plurality of data provider systems 110. In addition, the plurality of stream nodes 106 may ensure that the streamed data sent from the plurality of data provider systems 110 is well-formatted for controller device 102. Once the data has been regularized (well-formatted for controller device 102), the data is maintained by the plurality of stream nodes 106. Data maintenance may include appending new data to an existing data set, expiring data after it is no longer required, and sending and receiving blocks for load balancing. The analytic tasks perform statistical analysis on the streamed data.

Network 108 may include one or more networks of the same or different types. Network 108 can be any type of wired and/or wireless public or private network including a cellular network, a local area network, a wide area network such as the Internet, etc. Network 108 further may comprise sub-networks and consist of any number of devices.

Controller device 102 can include any type of computing device configured to provide the described processing. For illustration, FIG. 1 represents controller device 102 as a server computer. In general, a server computer may include faster processors, additional processors, more disk memory, and more random access memory (RAM) than a client computer as understood by a person of skill in the art. The computing device sends and receives signals through network 108 to/from data provider systems 110, to/from the plurality of stream nodes 106, and to/from data access systems 104. Controller device 102 may communicate using various transmission media that may be wired and/or wireless as understood by those skilled in the art.

The one or more computing devices of the data provider systems 110 may include computers of any form factor such as a laptop, a desktop, a smart phone, a personal digital assistant, an integrated messaging device, a tablet computer, etc. configured to provide the described processing. For illustration, FIG. 1 represents the data provider systems 110 with a first server computer 126, a second server computer 128, a third server computer 130, and a fourth server computer 132. The data provider systems 110 can include any number and any combination of form factors of computing devices that may be organized into subnets.

Figure 2:
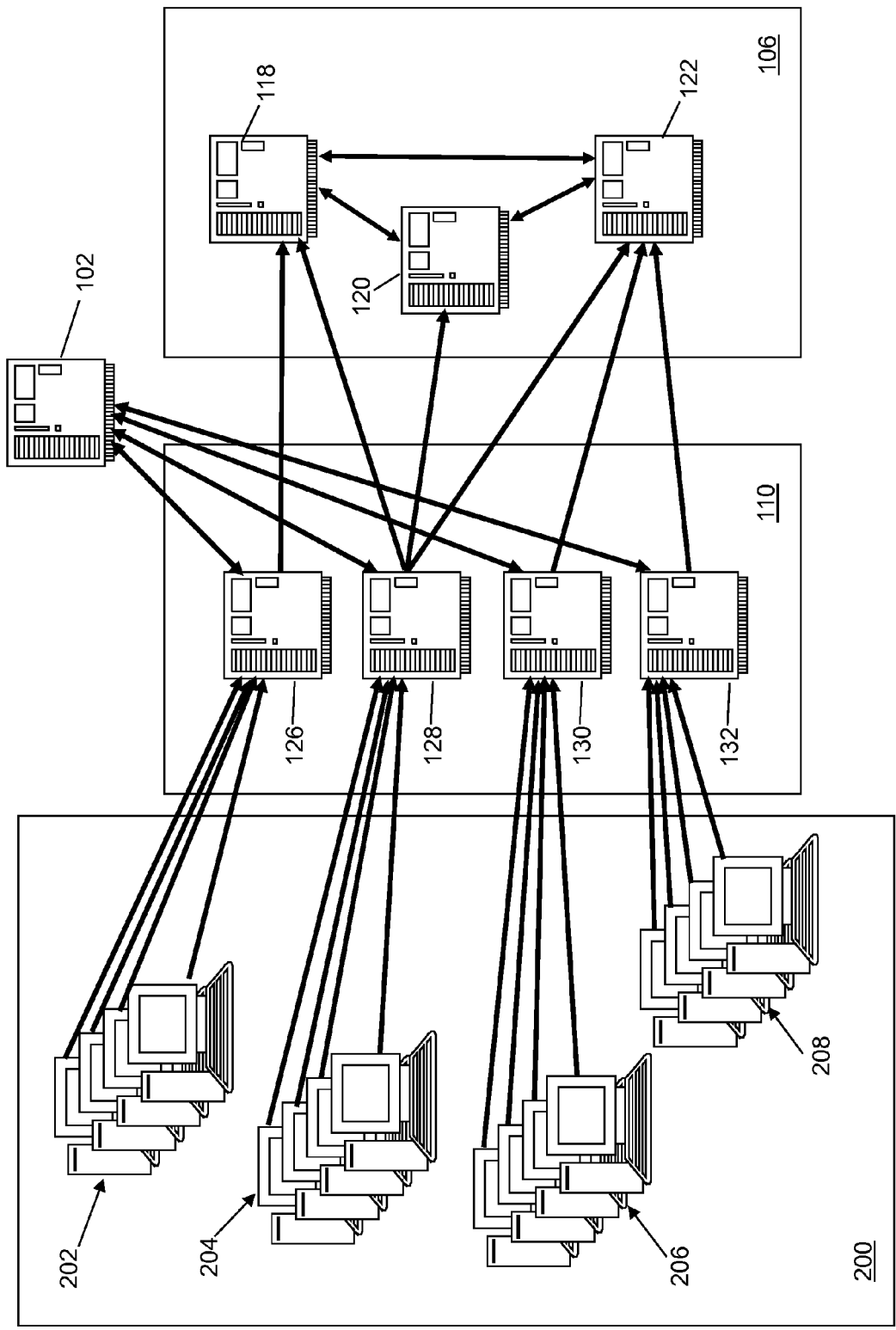
FIG. 2 depicts a connectivity diagram of the stream processing components of the stream processing system of FIG. 1 in accordance with an illustrative embodiment.

For illustration, referring to FIG. 2, the data provider systems 110 may communicate with a data generation system 200. Data generation system 200 may include a first plurality of computing devices 202, a second plurality of computing devices 204, a third plurality of computing devices 206, and a fourth plurality of computing devices 208 that are organized into subnets. The computing devices of data generation system 200 can include any number and any combination of form factors of computing devices configured to provide the described processing. Each subnet may communicate with a different computing device of the data provider systems 110. For example, the first plurality of computing devices 202 may be connected to communicate with first server computer 126 of the data provider systems 110; the second plurality of computing devices 204 may be connected to communicate with second server computer 128 of the data provider systems 110; the third plurality of computing devices 206 may be connected to communicate with third server computer 130 of the data provider systems 110; and the fourth plurality of computing devices 208 may be connected to communicate with fourth server computer 132 of the data provider systems 110.

The computing devices of the data provider systems 110 send and receive signals through network 108 to/from another of the one or more computing devices of the data provider systems 110, to/from controller device 102, to/from the plurality of stream nodes 106, and/or to/from the computing devices of data generation system 200. The one or more computing devices of the data provider systems 110 and of data generation system 200 may communicate using various transmission media that may be wired and/or wireless as understood by those skilled in the art.

The one or more computing devices of the plurality of stream nodes 106 may include computers of any form factor such as a laptop, a desktop, a smart phone, a personal digital assistant, an integrated messaging device, a tablet computer, etc. For illustration, FIG. 1 represents the plurality of stream nodes 106 with a fifth server computer 118, a sixth server computer 122, a seventh server computer 124, and an eighth server computer 126. The plurality of stream nodes 106 can include any number and any combination of form factors of computing devices configured to provide the described processing. For illustration, referring to FIG. 2, the plurality of stream nodes 106 may communicate with one or more computing device of the data provider systems 110. For example, first server computer 126 may be connected to communicate with fifth server computer 118 of the plurality of stream nodes 106; second server computer 128 may be connected to communicate with fifth server computer 118, with sixth server computer 120, and with seventh server computer 122 of the plurality of stream nodes 106; third server computer 130 may be connected to communicate with seventh server computer 122 of the plurality of stream nodes 106; and fourth server computer 132 may be connected to communicate with seventh server computer 122 of the plurality of stream nodes 106.

Figure 3:
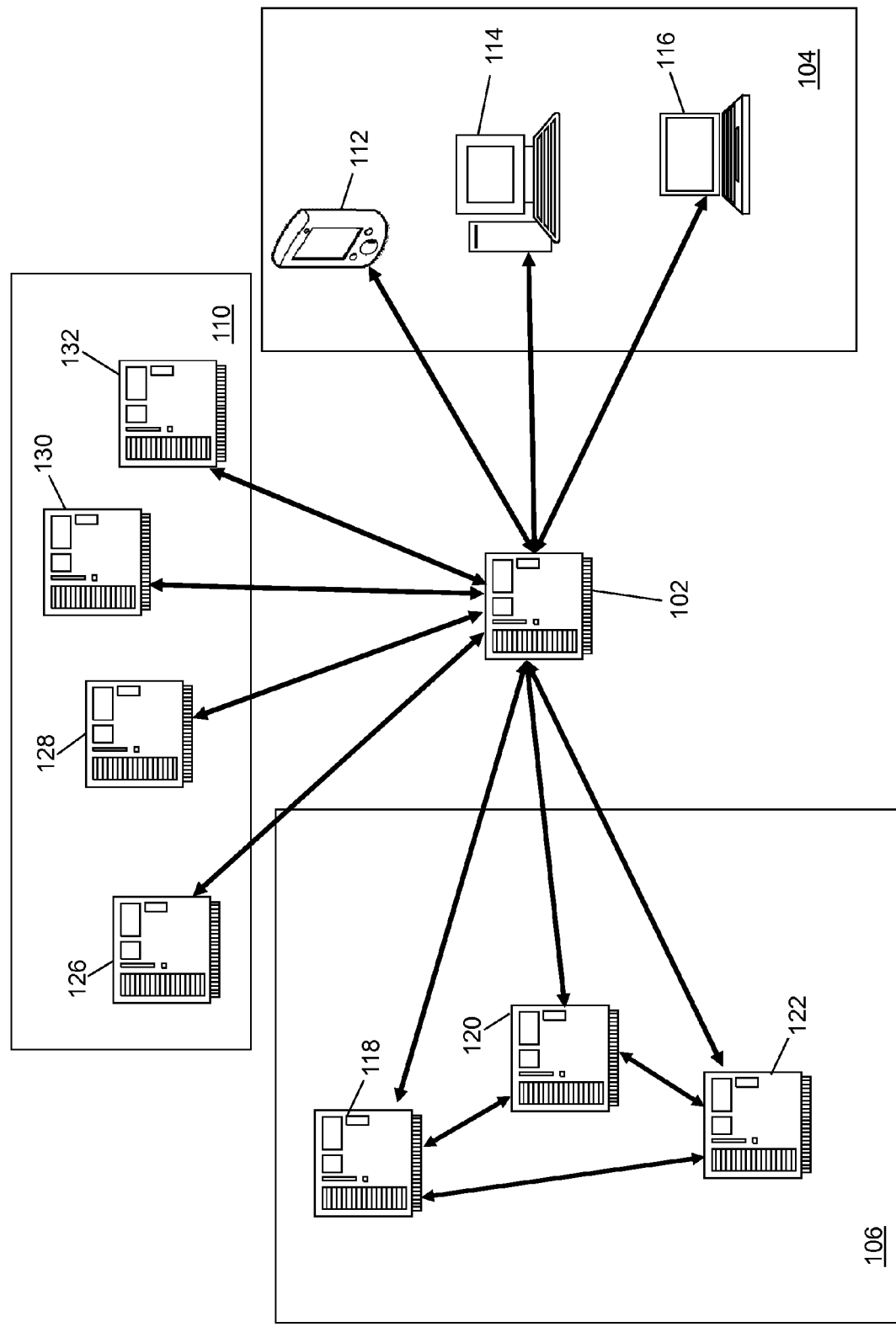
FIG. 3 depicts a connectivity diagram of the stream processing response components of the stream processing system of FIG. 1 in accordance with an illustrative embodiment.

Referring to FIGS. 1, 2, and 3, the computing devices of the plurality of stream nodes 106 send and receive signals through network 108 to/from another of the one or more computing devices of the plurality of stream nodes 106, to/from controller device 102, and/or to/from the data provider systems 110. The one or more computing devices of the plurality of stream nodes 106 may communicate using various transmission media that may be wired and/or wireless as understood by those skilled in the art.

Referring to FIGS. 1 and 3, the data access systems 104 can include any number and type of computing devices configured to provide the described processing. The computing devices of the data access systems 104 send and receive signals through network 108 to/from another of the one or more computing devices of the data access systems 104 and/or to/from controller device 102. The one or more computing devices of the data access systems 104 may include computers of any form factor such as a laptop 116, a desktop 114, a smart phone 112, an integrated messaging device, a personal digital assistant, a tablet computer, etc. The one or more computing devices of the data access systems 104 may communicate using various transmission media that may be wired and/or wireless as understood by those skilled in the art.

Figure 9:
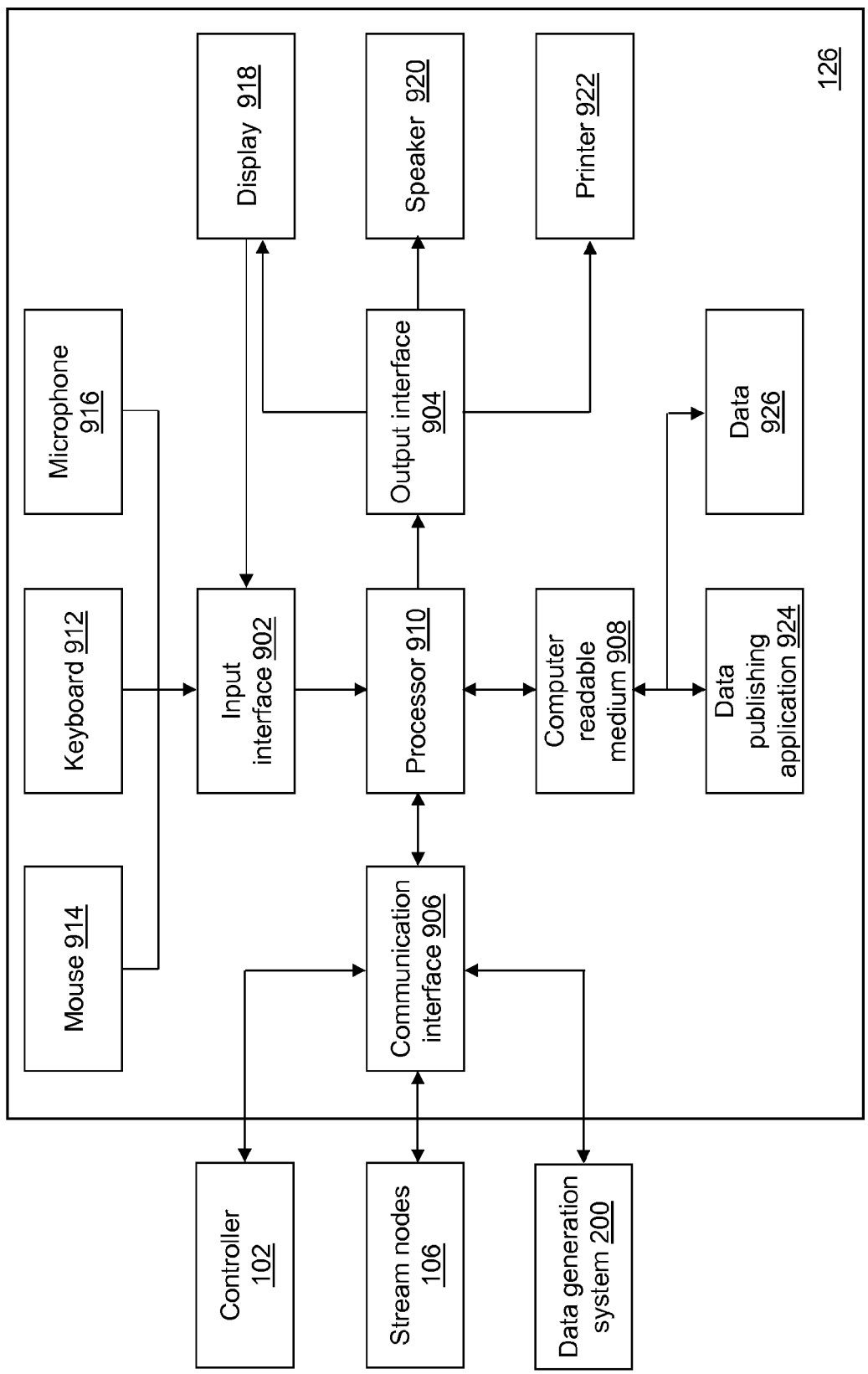
FIG. 9 depicts a data publishing device of the stream processing system of FIG. 1 in accordance with an illustrative embodiment.

For illustration, referring to FIG. 9, a block diagram of first server computer 126 is shown in accordance with an example embodiment. First server computer 126 is an example computing device of the data provider systems 110. First server computer 126 may include an input interface 902, an output interface 904, a communication interface 906, a computer-readable medium 908, a processor 910, a data publishing application 924, and data 926. Fewer, different, and additional components may be incorporated into first server computer 126.

Input interface 902 provides an interface for receiving information from the user for entry into first server computer 126 as understood by those skilled in the art. Input interface 902 may interface with various input technologies including, but not limited to, a keyboard 912, a mouse 914, a microphone 916, a display 918, a track ball, a keypad, one or more buttons, etc. to allow the user to enter information into first server computer 126 or to make selections presented in a user interface displayed on the display. The same interface may support both input interface 902 and output interface 904. For example, display 918 comprising a touch screen both allows user input and presents output to the user. First server computer 126 may have one or more input interfaces that use the same or a different input interface technology. The input interface technology further may be accessible by first server computer 126 through communication interface 906.

Output interface 904 provides an interface for outputting information for review by a user of first server computer 126. For example, output interface 904 may interface with various output technologies including, but not limited to, display 918, a speaker 920, a printer 922, etc. First server computer 126 may have one or more output interfaces that use the same or a different interface technology. The output interface technology further may be accessible by first server computer 126 through communication interface 906.

Communication interface 906 provides an interface for receiving and transmitting data between devices using various protocols, transmission technologies, and media as understood by those skilled in the art. Communication interface 906 may support communication using various transmission media that may be wired and/or wireless. First server computer 126 may have one or more communication interfaces that use the same or a different communication interface technology. For example, first server computer 126 may support communication using an Ethernet port, a Bluetooth antenna, a telephone jack, a USB port, etc. Data and messages may be transferred between first server computer 126 and controller 102, the one or more computing devices of the plurality of stream nodes 106, and/or the computing devices of data generation system 200 using communication interface 906.

Computer-readable medium 908 is an electronic holding place or storage for information so the information can be accessed by processor 910 as understood by those skilled in the art. Computer-readable medium 908 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. First server computer 126 may have one or more computer-readable media that use the same or a different memory media technology. For example, computer-readable medium 908 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. First server computer 126 also may have one or more drives that support the loading of a memory media such as a CD or DVD, an external hard drive, etc. One or more external hard drives further may be connected to first server computer 126 using communication interface 906.

Processor 910 executes instructions as understood by those skilled in the art. The instructions may be carried out by a special purpose computer, logic circuits, or hardware circuits. Processor 910 may be implemented in hardware and/or firmware. Processor 910 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 910 operably couples with input interface 902, with output interface 904, with communication interface 906, and with computer-readable medium 908 to receive, to send, and to process information. Processor 910 may retrieve a set of instructions from a permanent memory device and copy the instructions in an executable form to a temporary memory device that is generally some form of RAM. First server computer 126 may include a plurality of processors that use the same or a different processing technology.

Data publishing application 924 performs operations associated with generating, receiving, and/or publishing data. The operations may be implemented using hardware, firmware, software, or any combination of these methods. Referring to the example embodiment of FIG. 9, data publishing application 924 is implemented in software (comprised of computer-readable and/or computer-executable instructions) stored in computer-readable medium 908 and accessible by processor 910 for execution of the instructions that embody the operations of data publishing application 924. Data publishing application 924 may be written using one or more programming languages, assembly languages, scripting languages, etc.

Data publishing application 924 may be implemented as a Web application. For example, data publishing application 924 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

First server computer 126 may receive and store data 926 generated by a sensor, generated or captured in response to occurrence of an event or a transaction, generated by a device such as in response to an interaction by a user with the device, etc. For example, first server computer 126 may receive sales data as is it generated by a cash register, may receive sensor data as it is sensed by a sensor, may receive data generated by another device, etc. First server computer 126 coordinates the streaming of data 926 to one or more of the stream nodes of the plurality of stream nodes 106. For example, first server computer 126 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.), capital markets trading systems, fraud detection and prevention, personalized marketing, operational systems monitoring and management, cyber security analytics, etc.

Figure 4:
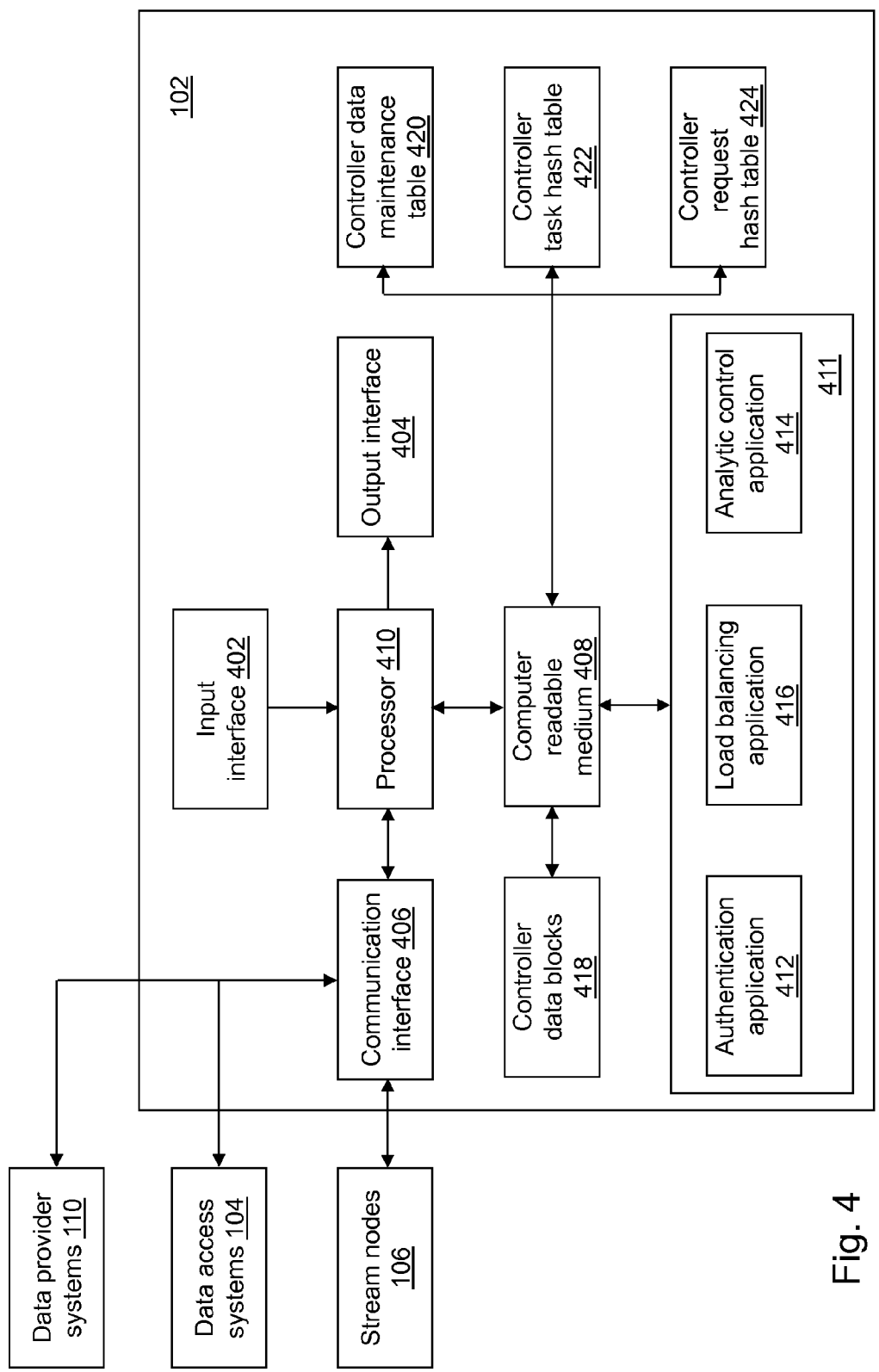
FIG. 4 depicts a controller device of the stream processing system of FIG. 1 in accordance with an illustrative embodiment.

Referring to FIG. 4, a block diagram of controller 102 is shown in accordance with an illustrative embodiment. Controller 102 may include a second input interface 402, a second output interface 404, a second communication interface 406, a second computer-readable medium 408, a second processor 410, a controller application 411, controller data blocks 418, a controller data maintenance table 420, a controller task hash table 422, and a controller request hash table 424. Fewer, different, and additional components may be incorporated into controller 102.

Second input interface 402 provides the same or similar functionality as that described with reference to input interface 902 of first server computer 126 though referring to controller 102. Second output interface 404 provides the same or similar functionality as that described with reference to output interface 904 of first server computer 126 though referring to controller 102. Second communication interface 406 provides the same or similar functionality as that described with reference to communication interface 906 of first server computer 126 though referring to controller 102. Data and messages may be transferred between controller 102 and the one or more computing devices of the plurality of stream nodes 106, data access systems 104, and/or the data provider systems 110 using second communication interface 406. Second computer-readable medium 408 provides the same or similar functionality as that described with reference to computer-readable medium 908 of first server computer 126 though referring to controller 102. Second processor 410 provides the same or similar functionality as that described with reference to processor 910 of first server computer 126 though referring to controller 102.

Controller application 411 may include an authentication application 412, an analytic control application 414, and a load balancing application 416. Authentication application 412, analytic control application 414, and load balancing application 416 of controller application 411 may be the same or different applications or part of an integrated, distributed application.

Authentication application 412 performs operations associated with authenticating data provider systems 110 before allowing streaming by data provider systems 110 to stream nodes 106 and with assigning data provider systems 110 to one or more stream nodes 106. The operations may be implemented using hardware, firmware, software, or any combination of these methods. Referring to the example embodiment of FIG. 4, authentication application 412 is implemented in software (comprised of computer-readable and/or computer-executable instructions) stored in second computer-readable medium 408 and accessible by second processor 410 for execution of the instructions that embody the operations of authentication application 412. Authentication application 412 may be written using one or more programming languages, assembly languages, scripting languages, etc.

Analytic control application 414 performs operations associated with coordinating and controlling the performance of analytics on the data streamed from data provider systems 110 and with provision of the analytic results to data access systems 104. The operations may be implemented using hardware, firmware, software, or any combination of these methods. Referring to the example embodiment of FIG. 4, analytic control application 414 is implemented in software (comprised of computer-readable and/or computer-executable instructions) stored in second computer-readable medium 408 and accessible by second processor 410 for execution of the instructions that embody the operations of analytic control application 414. Analytic control application 414 may be written using one or more programming languages, assembly languages, scripting languages, etc.

Load balancing application 416 performs operations associated with balancing a processing load between stream nodes 106 by reallocating the data provider assignments when needed. The operations may be implemented using hardware, firmware, software, or any combination of these methods. Referring to the example embodiment of FIG. 4, load balancing application 416 is implemented in software (comprised of computer-readable and/or computer-executable instructions) stored in second computer-readable medium 408 and accessible by second processor 410 for execution of the instructions that embody the operations of load balancing application 416. Load balancing application 416 may be written using one or more programming languages, assembly languages, scripting languages, etc.

Authentication application 412, analytic control application 414, and load balancing application 416 of controller application 411 may be written using different languages. One or more of authentication application 412, analytic control application 414, and load balancing application 416 of controller application 411 may be implemented as Web applications.

Figure 5:
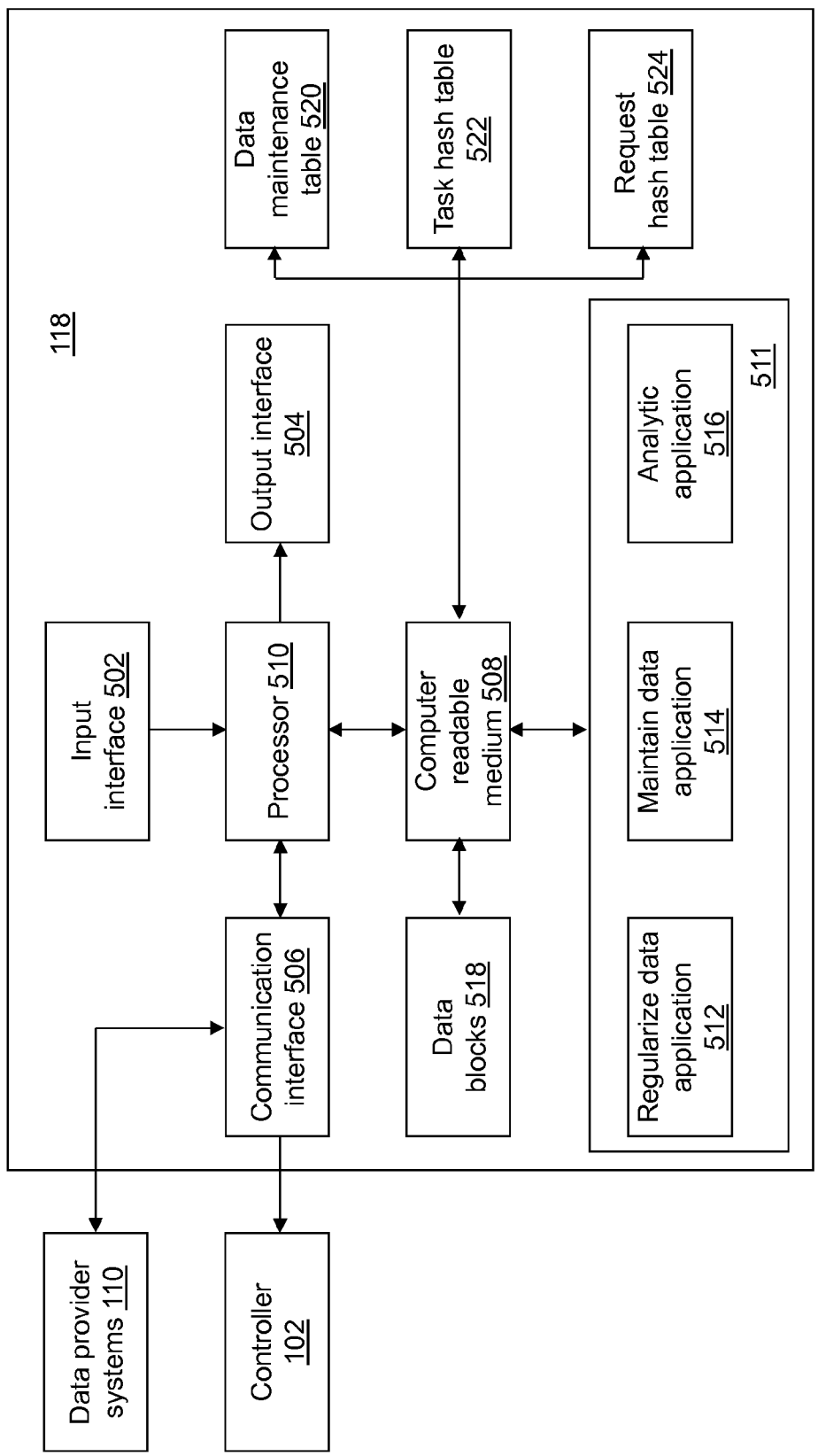
FIG. 5 depicts a computing device of a plurality of stream nodes of the stream processing system of FIG. 1 in accordance with an illustrative embodiment.

For illustration, referring to FIG. 5, a block diagram of fifth server computer 118 is shown in accordance with an example embodiment. Fifth server computer 118 is an example computing device of the stream nodes 106. Fifth server computer 118 may include a third input interface 502, a third output interface 504, a third communication interface 506, a third computer-readable medium 508, a third processor 510, a stream processing application 511, data blocks 518, a data maintenance table 520, a task hash table 522, and a request hash table 524. Fewer, different, and additional components may be incorporated into fifth server computer 118.

Third input interface 502 provides the same or similar functionality as that described with reference to input interface 902 of first server computer 126 though referring to fifth server computer 118. Third output interface 504 provides the same or similar functionality as that described with reference to output interface 904 of first server computer 126 though referring to fifth server computer 118. Third communication interface 506 provides the same or similar functionality as that described with reference to communication interface 906 of first server computer 126 though referring to fifth server computer 118. Data and messages may be transferred between fifth server computer 118 and other computing devices of the one or more computing devices of the plurality of stream nodes 106, controller 102, and/or the data provider systems 110 using third communication interface 506. Third computer-readable medium 508 provides the same or similar functionality as that described with reference to computer-readable medium 908 of first server computer 126 though referring to fifth server computer 118. Third processor 510 provides the same or similar functionality as that described with reference to processor 910 of first server computer 126 though referring to fifth server computer 118.

Stream processing application 511 may include a regularize data application 512, a maintain data application 514, and an analytic application 516. Regularize data application 512, maintain data application 514, and analytic application 516 of stream processing application 511 may be the same or different applications or part of an integrated, distributed application.

Regularize data application 512 performs operations associated with providing privilege separation between controller 102 and network 108 and with ensuring that the data being sent from data provider systems 110 is well-formatted for controller 102. The operations may be implemented using hardware, firmware, software, or any combination of these methods. Referring to the example embodiment of FIG. 5, regularize data application 512 is implemented in software (comprised of computer-readable and/or computer-executable instructions) stored in third computer-readable medium 508 and accessible by third processor 510 for execution of the instructions that embody the operations of regularize data application 512. Regularize data application 512 may be written using one or more programming languages, assembly languages, scripting languages, etc.

Maintain data application 514 performs operations associated with data maintenance, including appending new data to an existing data set, expiring data after it is no longer required, sending and receiving blocks for load balancing, and triggering execution of analytic application 516. The operations may be implemented using hardware, firmware, software, or any combination of these methods. Referring to the example embodiment of FIG. 5, maintain data application 514 is implemented in software (comprised of computer-readable and/or computer-executable instructions) stored in third computer-readable medium 508 and accessible by third processor 510 for execution of the instructions that embody the operations of maintain data application 514. Maintain data application 514 may be written using one or more programming languages, assembly languages, scripting languages, etc.

Analytic application 516 performs operations associated with performance of analytics on the data streamed from data provider systems 110 and with provision of the analytic results to controller 102. The operations may be implemented using hardware, firmware, software, or any combination of these methods. Referring to the example embodiment of FIG. 5, analytic application 516 is implemented in software (comprised of computer-readable and/or computer-executable instructions) stored in third computer-readable medium 508 and accessible by third processor 510 for execution of the instructions that embody the operations of analytic application 516. Analytic application 516 may be written using one or more programming languages, assembly languages, scripting languages, etc.

Regularize data application 512, maintain data application 514, and analytic application 516 of stream processing application 511 may be written using different languages. One or more of regularize data application 512, maintain data application 514, and analytic application 516 of stream processing application 511 may be implemented as Web applications.

Figure 6:
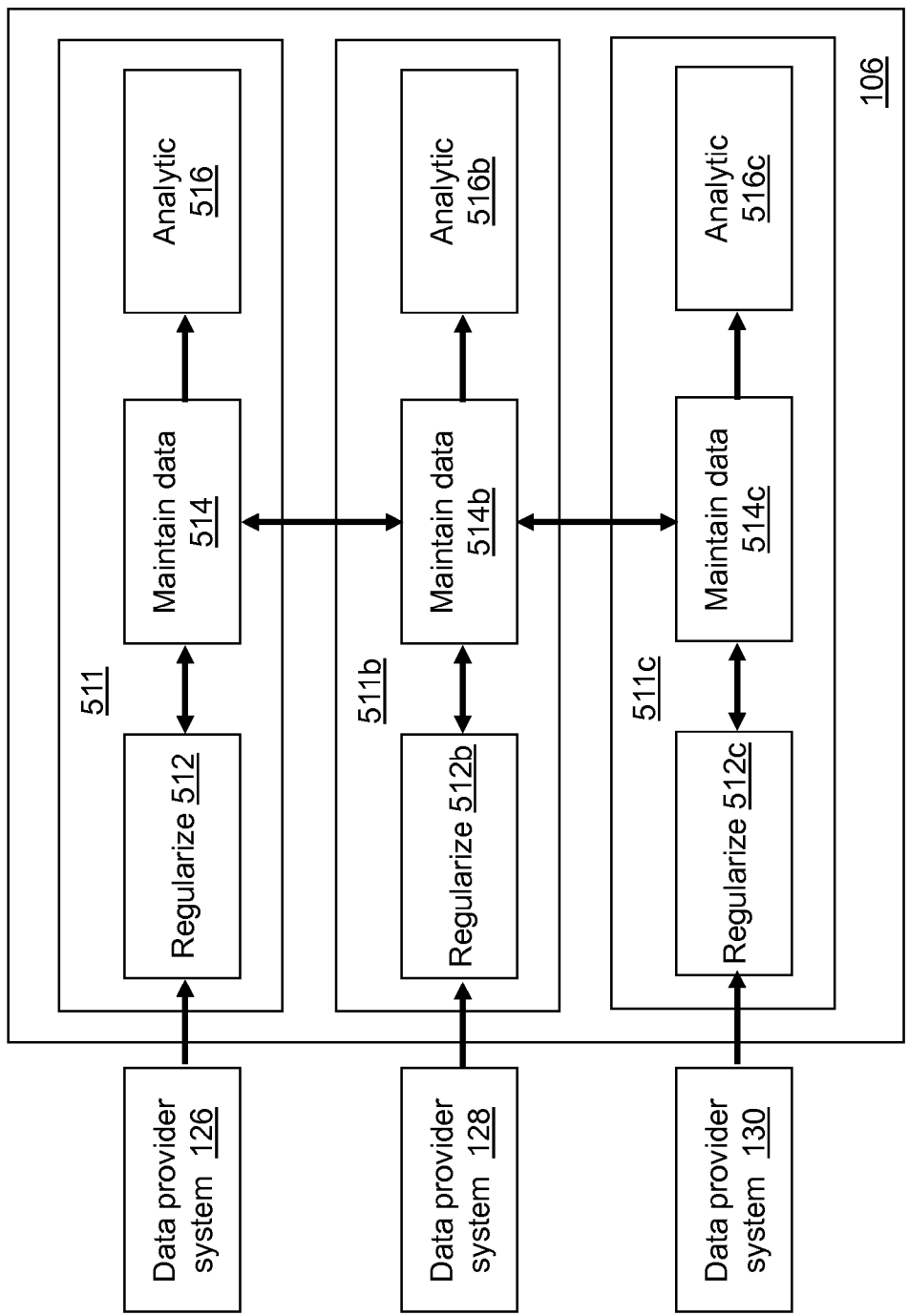
FIG. 6 depicts a block diagram illustrating interactions between the components of a stream processing application executing at each computing device of the plurality of stream nodes of the stream processing system of FIG. 1 in accordance with an illustrative embodiment.

Instances of regularize data application 512, maintain data application 514, and analytic application 516 are executing at each stream node of the plurality of stream nodes 106. For example, as shown referring to FIG. 6, regularize data application 512, maintain data application 514, and analytic application 516 of stream processing application 511 are executing at fifth server computer 118; a second regularize data application 512b, a second maintain data application 514b, and a second analytic application 516b of a second stream processing application 511b may be executing at sixth server computer 120; and a third regularize data application 512c, a third maintain data application 514c, and a third analytic application 516c of a third stream processing application 511c may be executing at seventh server computer 122. Maintain data application 514, second maintain data application 514b, and third maintain data application 514c may coordinate a transfer of one or more blocks under control of load balancing application 416 as described with more detail below.

Stream processing application 511, second stream processing application 511b, and third stream processing application 511c may be connected to receive different streams of data from the same or different computing device of the data provider systems 110. For example, at the instance illustrated in FIG. 6, stream processing application 511 is connected to receive a first stream of data from first server computer 126; second stream processing application 511b is connected to receive a second stream of data from second server computer 128; and third stream processing application 511c is connected to receive a third stream of data from third server computer 130.

Controller application 411 and stream processing application 511 may be the same or different applications or part of an integrated, distributed application supporting some or all of the same or additional types of functionality as described herein. As an example, the functionality provided by controller application 411 and stream processing application 511 may be provided as part of the SAS® LASR™ Analytic Server developed and provided by SAS Institute Inc. of Cary, N.C., USA. As another example, the functionality provided by controller application 411 and stream processing application 511 may be provided as part of the system described in U.S. patent application Ser. Nos. 14/747,763 and 14/747,965, both of which were filed Jun. 23, 2015, and assigned to SAS Institute Inc. of Cary, N.C., USA.

Figure 7:
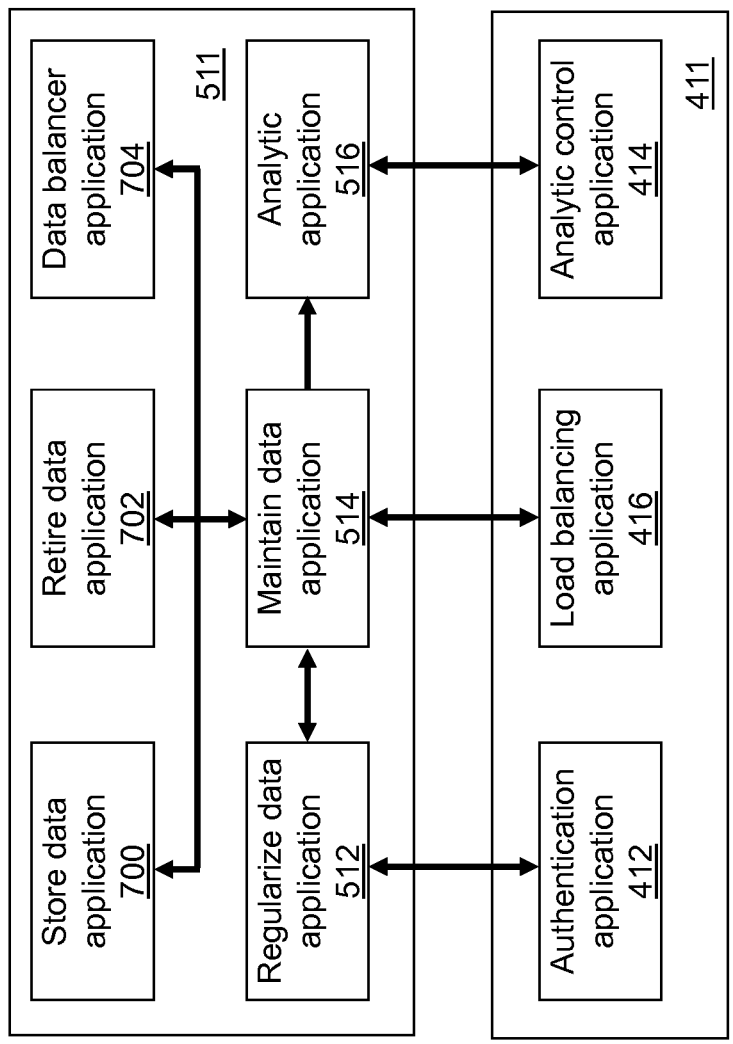
FIG. 7 depicts a block diagram illustrating interactions between the components of the stream processing application executing at each computing device of the plurality of stream nodes and components of a controller application executing at the controller device of the stream processing system of FIG. 1 in accordance with an illustrative embodiment.

Referring to FIG. 7, interactions between controller application 411 and stream processing application 511 are shown in accordance with an illustrative embodiment. A new data provider wanting to connect to stream processing system 100 first connects to authentication application 412 and requests access. For example, using public-private keys, the new data provider provides authentication information to authentication application 412, and authentication application 412 authenticates and authorizes the new data provider to connect to stream processing system 100. Once authenticated, authentication application 412 determines, for example, based upon current data rates across the plurality of stream nodes 106, to which computing device of the plurality of stream nodes 106 the new data provider of data provider systems 110 should connect. Once authentication application 412 has made the determination, it notifies the new data provider and the regularize data application 512 executing at the determined computing device of the plurality of stream nodes 106 that the new data provider will be connecting, providing signed information to them to allow the regularize data application 512 to prove the new data provider was directed by authentication application 412 (to prevent a rogue new data provider from connecting wherever they wish). The new data provider then connects directly to the regularize data application 512 inbound port. Regularize data application 512 accepts the connection (with authentication data) and streaming begins if the authentication data matches what regularize data application 512 is expecting based on the communication from authentication application 412. As illustrated in FIG. 2, a new data provider may be instructed to connect to more than one stream node and to split the stream of data between the determined stream nodes.

At some point, regularize data application 512 or maintain data application 514 may become overwhelmed by the amount of streamed data. The maintain data application 514, if overwhelmed, may notify regularize data application 512. At this point, regularize data application 512 may stop accepting incoming connections (any connecting data provider may sleep for a random instant and begin the connection process again by contacting authentication application 412) and may notify authentication application 412 that it is no longer accepting connections. As additional responses, regularize data application 512 may direct the second-, third-, etc. fastest data provider to disconnect. The data provider begins connection negotiation with the authentication application 412 again. Alternately, regularize data application 512 may request that a data provider split (after notifying the authentication application 412 of its decision), causing the data provider system to negotiate a new connection to another stream node of the plurality of stream nodes 106. The data provider distributes its load evenly between its stream node connections. Regularize data application 512 may notify a data provider of the data provider systems 110 that it is being disconnected because it has not brought its rate down despite requests to split.

At some point the data distribution across the stream nodes 106 may become uneven or unbalanced. As data arrives, a block-count-per-node may be maintained by load balancing application 416 in communication with maintain data application 514 executing at each stream node. Based upon a non-deterministic algorithm, load balancing application 416 may redistribute some number of blocks from an overburdened stream node to one or more underburdened stream nodes. The non-deterministicity alleviates difficulties in pathological situations where the load spikes at stream nodes just as the blocks are redistributed. The probability of rebalancing may depend on a severity of an overburden condition and a tunable constant. The stream nodes to which the blocks are distributed may be proportional to those nodes' underburden.

Analytic application 516 executing at each stream node integrates with analytic control application 414 to perform the analysis requested by a user at a data access system of the data access system 104. Analytic application 516 may support a plurality of analytic tasks. When an analytic task is created, analytic application 516 creates a thread dedicated to that analytic task. This thread may monitor a command queue coming from analytic application 516. As another option, the command queue may be connected to a thread pool that selects a task from the command queue and executes it, where the task is obtained via a callback. The commands correspond to events to be executed and contain details about the event and an identifier. The thread may execute a corresponding event callback associated with the analytic task. When the event processing has completed (either when the callback completes (synchronous model) or when the thread receives notice from the analytic task (asynchronous model), the thread puts the completed event back onto a completion queue. Analytic application 516 monitors the completion queue to know when an event has finished processing. Analytic application 516 may wait for an event to be processed before continuing with some portion of its operations. For example, if the event is still being processed by the analytic task, analytic application 516 may not append new data that has come in to data blocks 518 as described below.

If necessary to complete the analytic result, analytic control application 414 is notified of changes that have occurred. Analytic control application 414 similarly may support a plurality of analytic tasks. Analytic control application 414 performs further analysis (for instance, updating a sum) and, if necessary, sends an update to the requesting data access system of data access systems 104. If an event happens at analytic control application 414, controller 102 notifies analytic application 516 and the event processes in a similar manner. Communication between analytic tasks and their respective data access system request are achieved by a thread created for that analytic task's connection with the thread monitoring two event queues, the completion queue and the data access system request queue.

As an example, assuming the data access system is watching a live average item sales price on worldwide sales of butter, as items are purchased, the point of sale computing devices send purchase data to a store data center (e.g., a computing device of the first plurality of computing devices 202) which sends the store data as it comes in to the company datacenter (e.g., first server computer 126) that is a data provider system of data provider systems 110. As the data arrives at the stream node (e.g., fifth server computer 118), maintain data application 514 adds the new product data to a current block of data blocks 518 and triggers analytic application 516. Analytic application 516 updates the command queue associated with the appropriate analytic task. The analytic task may be configured to compute an average of the purchase data and to update a sum and item counts. A WHERE clause may be used by the analytic task to restrict the information to the butter stock keeping unit. The task may use the MPI to send an updated result for this stream node to controller 102, which fires its associated analytic task and absorbs updated result, computes a new average, and sends the new average to the requesting data access system. A plurality of requesting data access systems may receive the updated result.

The data access system can request additional analysis on an instantaneous snapshot of the data at any point in time. For example, the data access system may request a histogram of butter sales by the second for the last three minutes. The data access system sends controller 102 a "Histogram action" request, which loads (if necessary) data from disk and performs the "Histogram action" with the respective WHERE clause. As a result, controller 102 can provide streaming analytics and windowed analytics.

Still referring to FIG. 7, maintain data application 514 may include a store data application 700, a retire data application 702, and a data balancer application 704. Store data application 700, retire data application 702, and data balancer application 704 of maintain data application 514 may be the same or different applications or part of an integrated, distributed application. Store data application 700, retire data application 702, and data balancer application 704 of maintain data application 514 may be written using different languages. One or more of store data application 700, retire data application 702, and data balancer application 704 of maintain data application 514 may be implemented as Web applications. One or more of store data application 700, retire data application 702, and data balancer application 704 may execute on the same or different threads.

Figure 8:
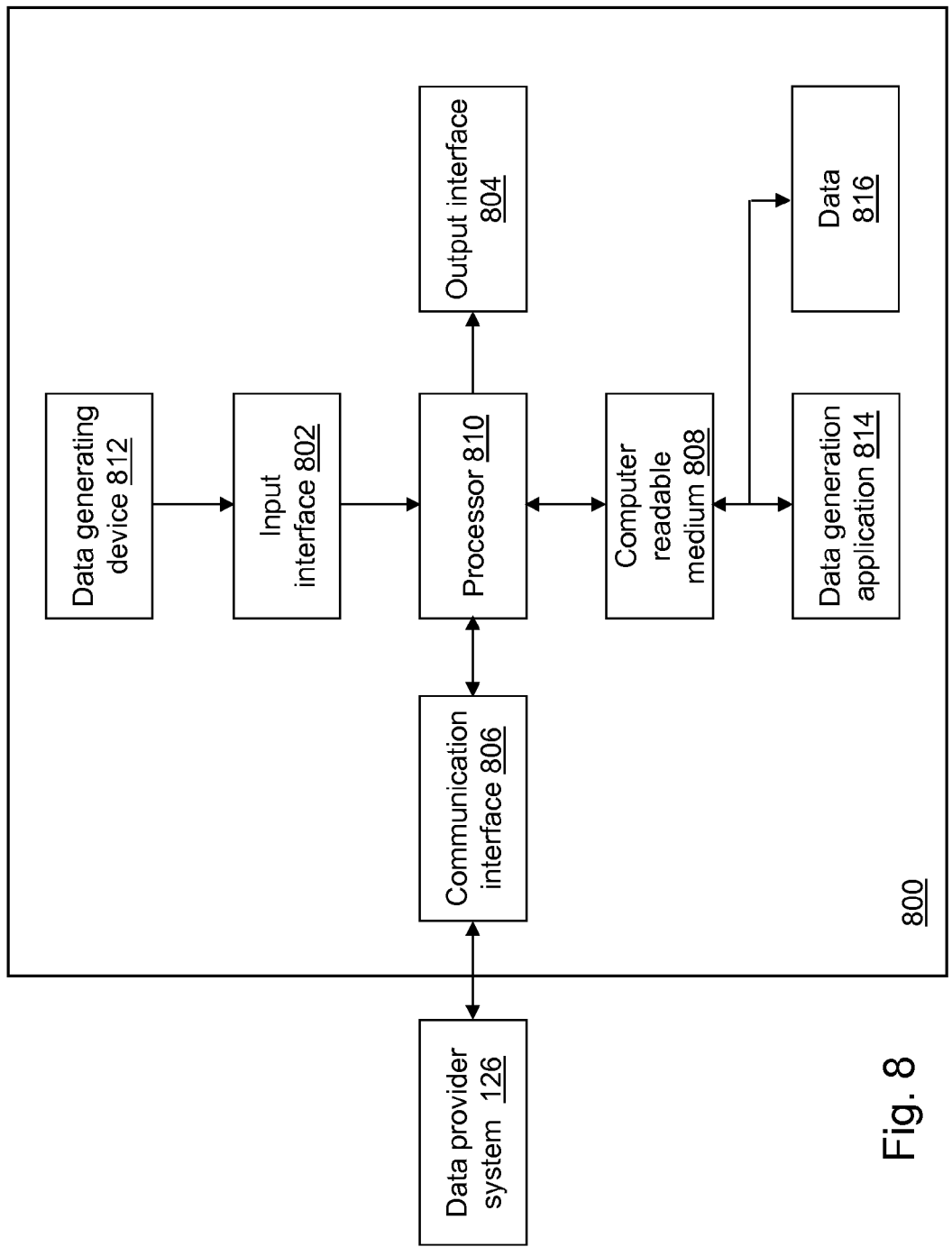
FIG. 8 depicts a data generation device of the stream processing system of FIG. 2 in accordance with an illustrative embodiment.

For illustration, referring to FIG. 8, a block diagram of a data generation device 800 is shown in accordance with an example embodiment. Data generation device 800 is an example computing device of data generation system 200. Data generation device 800 may include a fourth input interface 802, a fourth output interface 804, a fourth communication interface 806, a fourth computer-readable medium 808, a fourth processor 810, a data generation application 814, and data 816. Fewer, different, and additional components may be incorporated into data generation device 800.

Fourth input interface 802 provides the same or similar functionality as that described with reference to input interface 902 of first server computer 126 though referring to data generation device 800. Fourth output interface 804 provides the same or similar functionality as that described with reference to output interface 904 of first server computer 126 though referring to data generation device 800. Fourth communication interface 806 provides the same or similar functionality as that described with reference to communication interface 906 of first server computer 126 though referring to data generation device 800. Data and messages may be transferred between data generation device 800 and a computing device of the data provider systems 110 using fourth communication interface 806. For illustration, data generation device 800 is communicating with first server computer 126. Fourth computer-readable medium 808 provides the same or similar functionality as that described with reference to computer-readable medium 908 of first server computer 126 though referring to data generation device 800. Fourth processor 810 provides the same or similar functionality as that described with reference to processor 910 of first server computer 126 though referring to data generation device 800.

Data generation application 814 performs operations associated with generating data 816 and sending the generated data to a computing device of the data provider systems 110. A data generating device 812 may provide data 816 to data generation device 800 through fourth input interface 802 or fourth communication interface 806. The operations may be implemented using hardware, firmware, software, or any combination of these methods. Referring to the example embodiment of FIG. 8, data generation application 814 is implemented in software (comprised of computer-readable and/or computer-executable instructions) stored in fourth computer-readable medium 808 and accessible by fourth processor 810 for execution of the instructions that embody the operations of data generation application 814. Data generation application 814 may be written using one or more programming languages, assembly languages, scripting languages, etc. Data generation application 814 may be implemented as a Web application.

Data generating device 812 generates data 816 of interest to a data access device of the data access systems 104. For illustration, data generating device 812 may be any type of sensor, another computing device, a point of sale device, etc. Data 816 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

Figure 10:
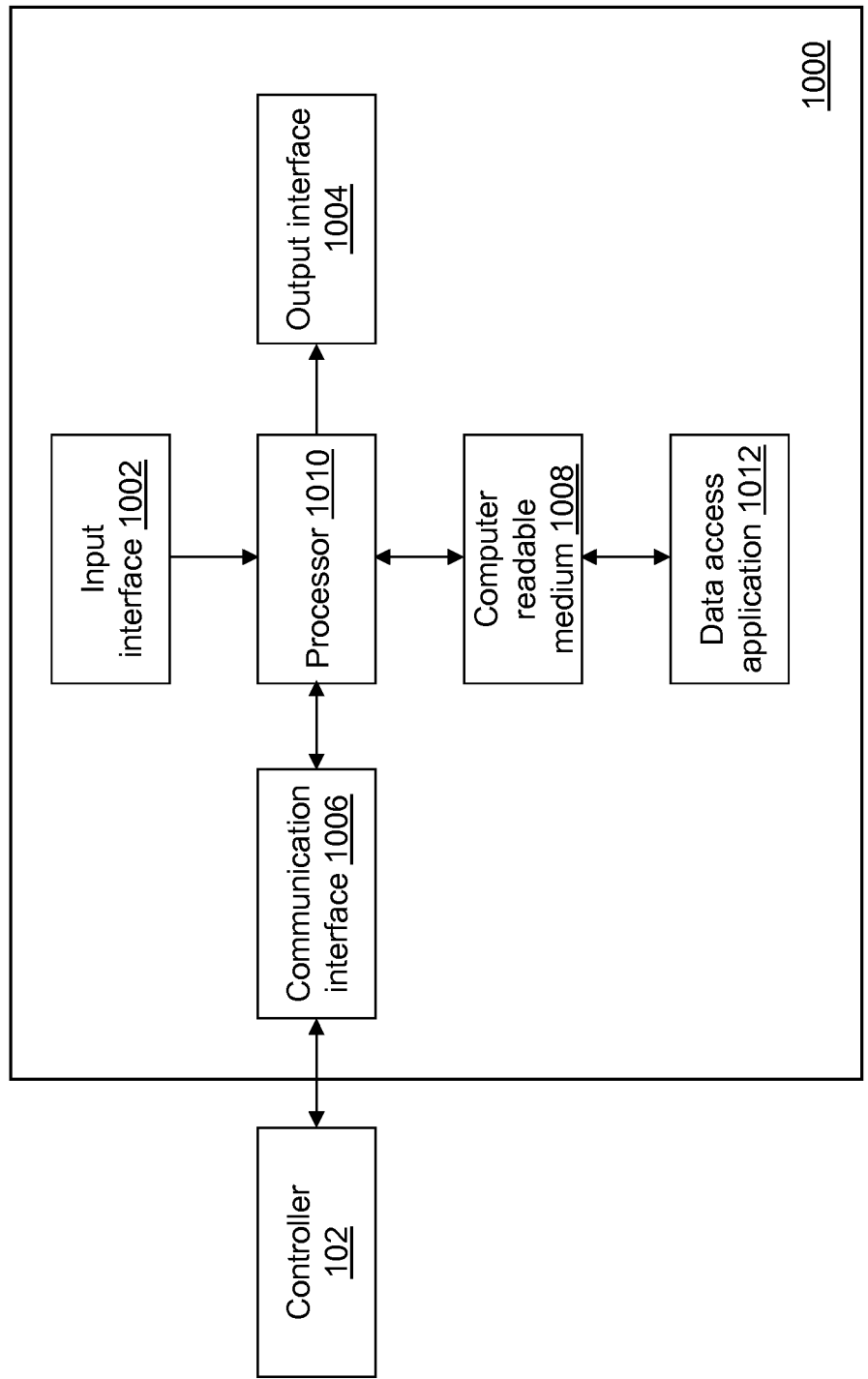
FIG. 10 depicts a data access device of the stream processing system of FIG. 1 in accordance with an illustrative embodiment.

For illustration, referring to FIG. 10, a block diagram of a data access device 1000 is shown in accordance with an example embodiment. Data access device 1000 is an example computing device of data access systems 104. Data access device 1000 may include a fifth input interface 1002, a fifth output interface 1004, a fifth communication interface 1006, a fifth computer-readable medium 1008, a fifth processor 1010, and a data access application 1012. Fewer, different, and additional components may be incorporated into data access device 1000.

Fifth input interface 1002 provides the same or similar functionality as that described with reference to input interface 902 of first server computer 126 though referring to data access device 1000. Fifth output interface 1004 provides the same or similar functionality as that described with reference to output interface 904 of first server computer 126 though referring to data access device 1000. Fifth communication interface 1006 provides the same or similar functionality as that described with reference to communication interface 906 of first server computer 126 though referring to data access device 1000. Data and messages may be transferred between data access device 1000 and controller 102 using fifth communication interface 1006. Fifth computer-readable medium 1008 provides the same or similar functionality as that described with reference to computer-readable medium 908 of first server computer 126 though referring to data access device 1000. Fifth processor 1010 provides the same or similar functionality as that described with reference to processor 910 of first server computer 126 though referring to data access device 1000.

Data access application 1012 performs operations associated with requesting a stream of data and requesting that an analytic be performed on the stream of data. The operations may be implemented using hardware, firmware, software, or any combination of these methods. Referring to the example embodiment of FIG. 10, data access application 1012 is implemented in software (comprised of computer-readable and/or computer-executable instructions) stored in fifth computer-readable medium 1008 and accessible by fifth processor 1010 for execution of the instructions that embody the operations of data access application 1012. Data access application 1012 may be written using one or more programming languages, assembly languages, scripting languages, etc. Data access application 1012 may be implemented as a Web application.

Figure 11:
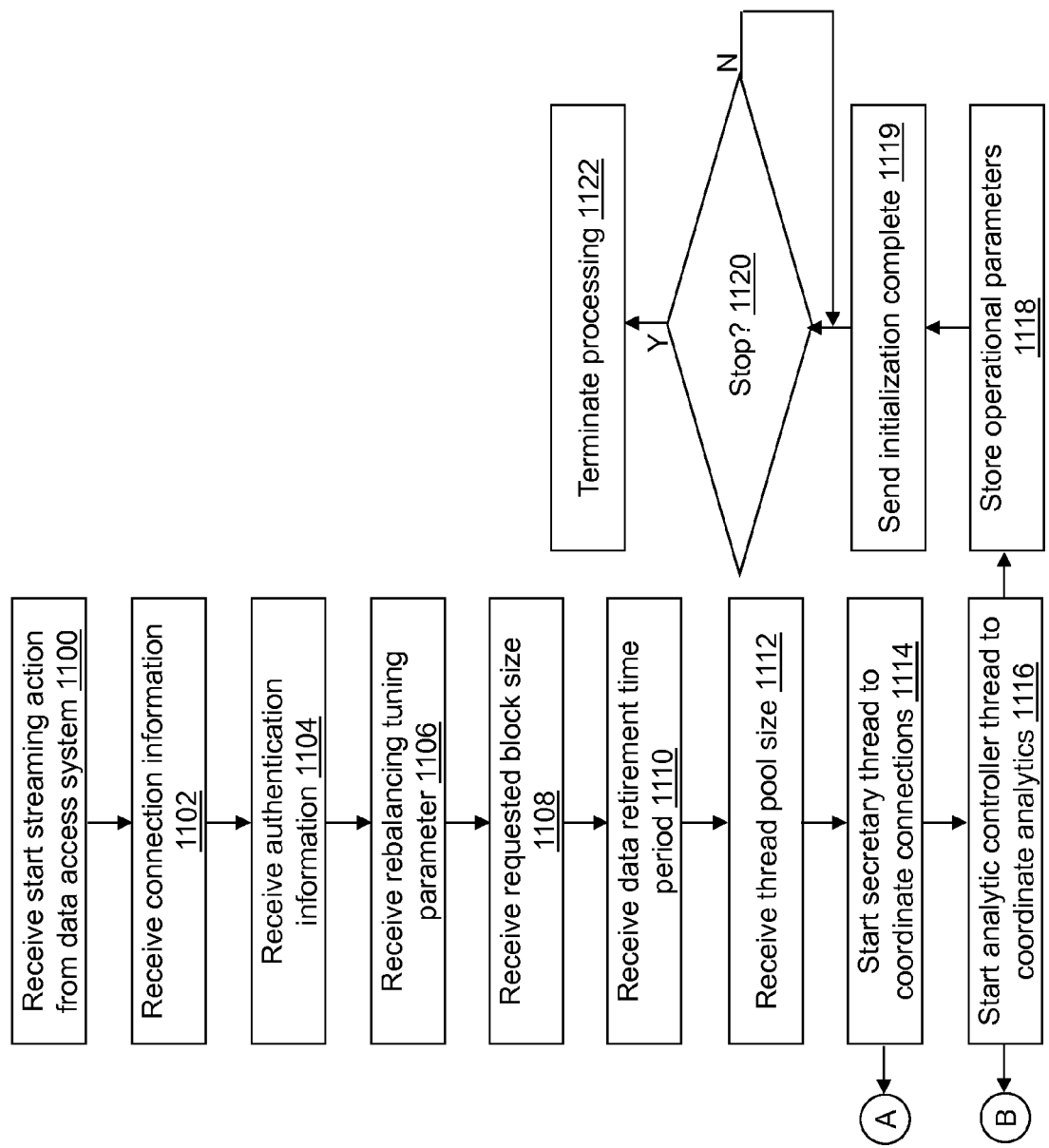
FIG. 11 depicts a flow diagram illustrating examples of operations performed by the controller device of FIG. 4 in accordance with an illustrative embodiment.

Referring to FIG. 11, example operations associated with controller application 411 of controller 102 are described. Additional, fewer, or different operations may be performed depending on the embodiment. The order of presentation of the operations of FIG. 11 is not intended to be limiting. A user can interact with one or more user interface windows presented to the user in a display at a data access system, which triggers different functionality of controller application 411 executing at controller 102. Similarly, a user can interact with one or more user interface windows presented to the user in a display at a data provider computing device, which triggers different functionality of controller application 411 executing at controller 102. Although some of the operational flows are presented in sequence, the various operations may be performed in various repetitions, concurrently, and/or in other orders than those that are illustrated. As further understood by a person of skill in the art, various operations may be performed in parallel, for example, using a plurality of threads. For illustration, controller application 411 may be executing on a main thread of controller 102.

In an operation 1100, a start streaming action is received from a data access system of data access systems 104. Analytic processing may already be executing at controller device 102, or at another computing device in communication with controller device 102. For example, an analytic server such as that provided by the SAS® LASR™ Analytic Server or as described in U.S. patent application Ser. Nos. 14/747,763 and 14/747,965 may already be executing and performing analytics on non-streamed data or other streamed data. For illustration, the start streaming action may have been triggered by a user at the data access system using a command such as StartStream with one or more command options.

In an operation 1102, connection information is received. In an operation 1104, authentication information is received. In an operation 1106, a value of a rebalancing tuning parameter is received. In an operation 1108, a value of a requested block size is received. In an operation 1110, a value of a data retirement time period is received. In an operation 1112, a value of a thread pool size is received.

The received information and values may be entered as options with the command, may be default values stored on second computer-readable medium 408 or on another computer-readable medium accessible through second communication interface 406, may be entered in response to a query for a value presented in a display possibly using one or more user interface windows, etc. Example connection information may include data provider port numbers. Example authentication information may include keys or challenge/response secrets. Authentication information may include authorization information. The received information and values may be stored in a data structure stored in controller data maintenance table 420.

Figure 12:
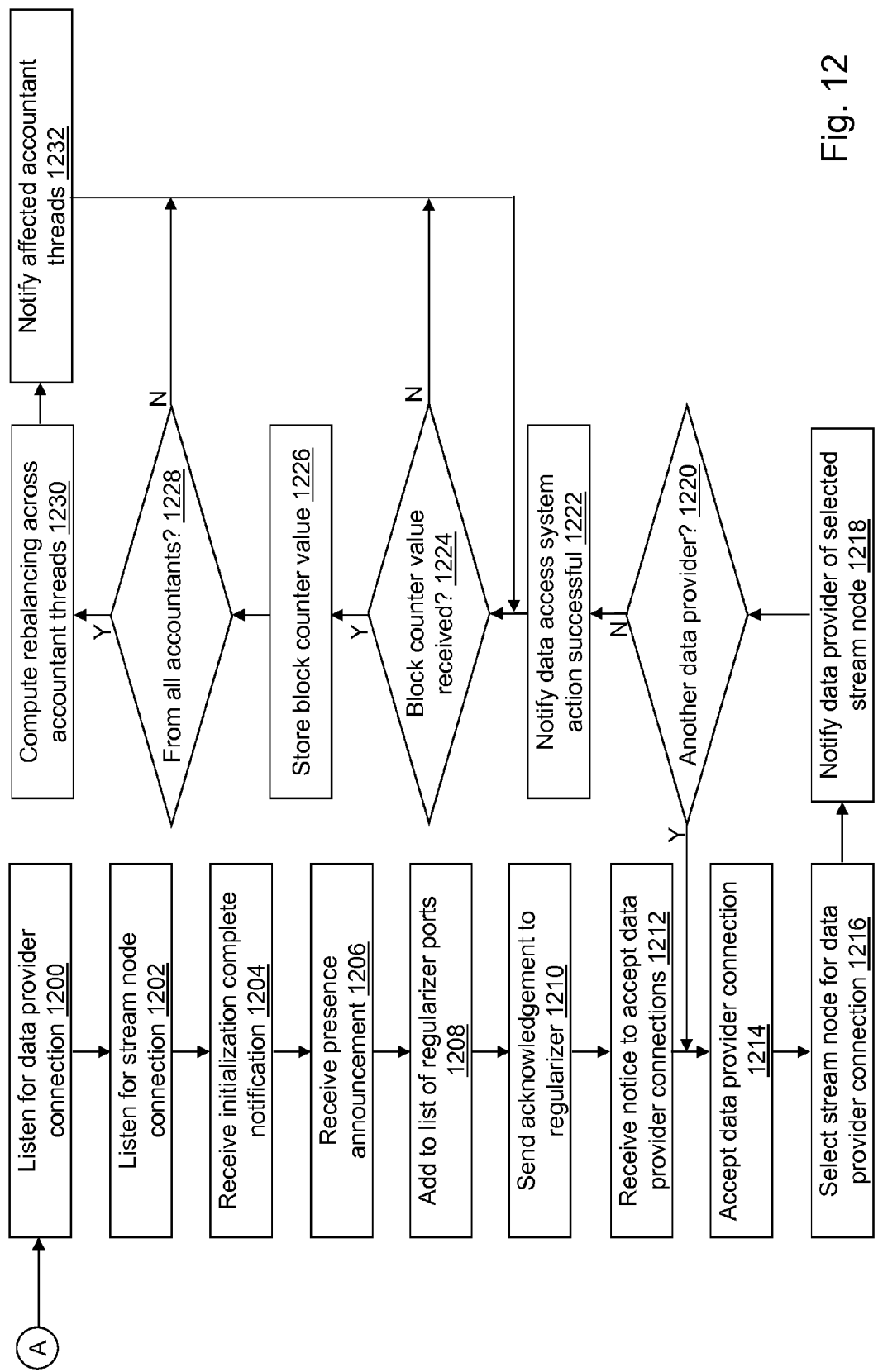
FIG. 12 depicts a flow diagram illustrating examples of operations performed by a secretary thread executing at the controller device of FIG. 4 in accordance with an illustrative embodiment.

In an operation 1114, a secretary thread is started to coordinate the connections between the plurality of data provider systems 110 and the plurality of stream nodes 106. FIG. 12 depicts example operations performed by the started secretary thread.

Figure 13:
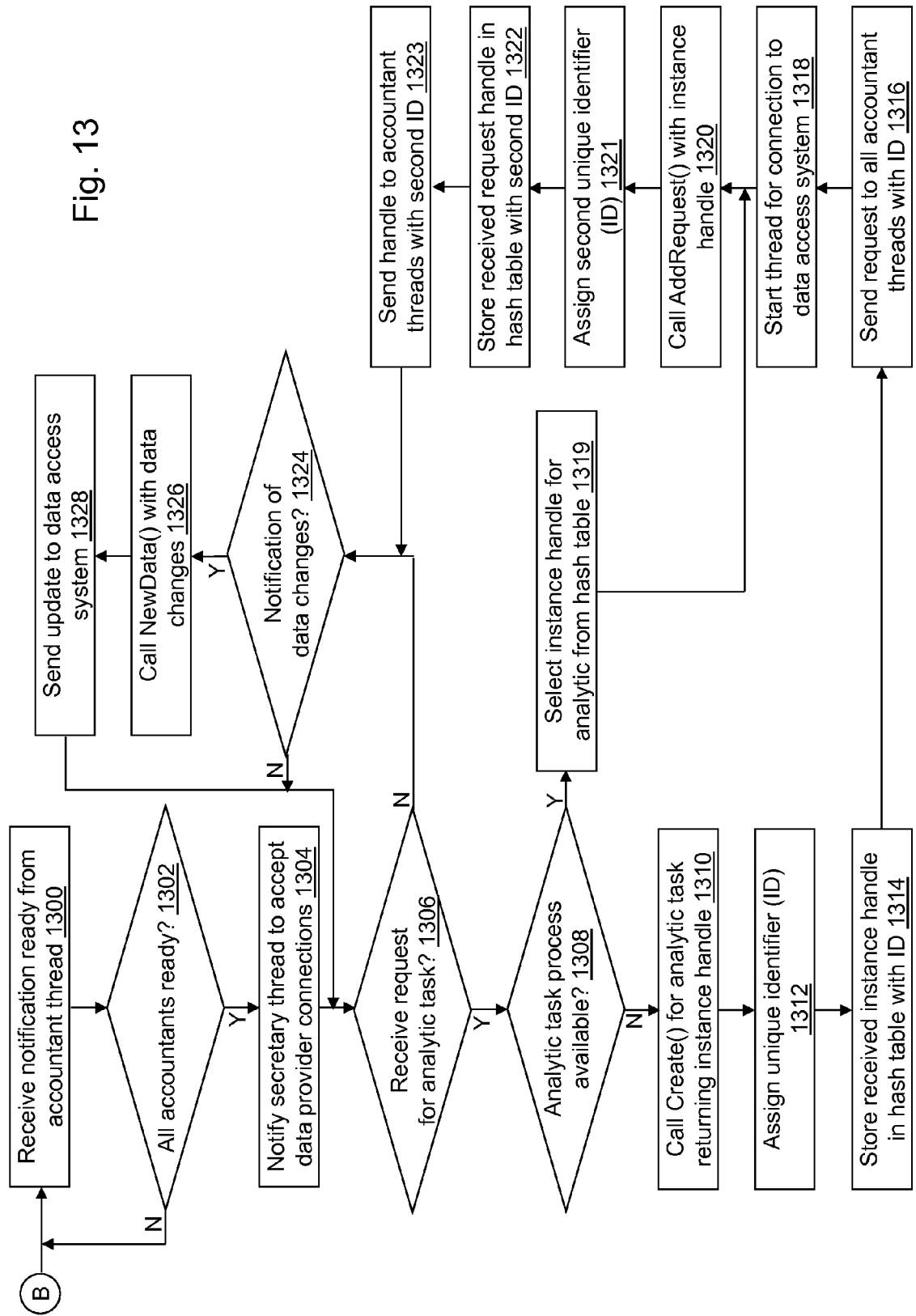
FIG. 13 depicts a flow diagram illustrating examples of operations performed by a controller thread executing at the controller device of FIG. 4 in accordance with an illustrative embodiment.

In an operation 1116, an analytic controller thread is started to coordinate the analytics performed on controller data blocks 418. FIG. 13 depicts example operations performed by the started analytic controller thread.

In an operation 1118, thread information and notification/synchronization methods such as shared memory regions and locks related to the secretary thread and the analytic controller thread are stored in the data structure stored in controller data maintenance table 420.

In an operation 1119, an initialization complete message is sent to the started secretary thread.

In an operation 1120, a determination is made concerning whether or not a request to stop analytic and/or stream processing is received, for example, from the system of data access systems 104. If a request to stop analytic and/or stream processing is received, processing continues in an operation 1122. If a request to stop analytic and/or stream processing is not received, processing continues in operation 1120 to continue monitoring for a terminate command.

Referring to FIG. 12, example operations associated with the started secretary thread of controller 102 are described. Additional, fewer, or different operations may be performed depending on the embodiment. The order of presentation of the operations of FIG. 12 is not intended to be limiting. Although some of the operational flows are presented in sequence, the various operations may be performed in various repetitions, concurrently, and/or in other orders than those that are illustrated. As further understood by a person of skill in the art, various operations may be performed in parallel, for example, using a plurality of threads.

In an operation 1200, the secretary thread listens for connection requests from the plurality of data provider systems 110. In an operation 1202, the secretary thread listens for connection requests from the plurality of stream nodes 106. For example, the secretary thread listens for connection requests from the plurality of data provider systems 110 either on a user-specified transmission control protocol (TCP) port or on an automatically determined TCP port. The secretary thread may also listen for connections from the plurality of stream nodes 106 on a separate, internal TCP port.

In an operation 1204, the secretary thread receives the initialization complete message from the main thread. The secretary thread may be in a NOCONNECT state until notified that initialization is complete.

In an operation 1206, the secretary thread receives a presence announcement from one or more regularizer processes as discussed further below. In an operation 1208, each of the one or more regularizer processes from which a presence announcement is received is added to a list of regularizer ports. In an operation 1210, the secretary thread sends an acknowledgement to each of the one or more regularizer processes from which a presence announcement was received.

In an operation 1212, the secretary thread receives a notice to accept data provider connections from the started analytic controller thread of controller 102 as discussed further below.

In an operation 1214, the secretary thread accepts a data provider connection request. For example, using public-private keys, the data provider system authenticates the secretary thread, and the secretary thread authenticates and authorizes the data provider system.

In an operation 1216, the secretary thread selects a stream node of the plurality of stream nodes 106 to which the data provider system is to connect. For example, the secretary thread selects a stream node based upon current data rates across the plurality of stream nodes 106.

In an operation 1218, the secretary thread notifies the data provider system and the selected stream node where the data provider system will be connecting, providing signed information to both computing devices to allow the selected stream node to prove that the data provider system was directed by the secretary thread to prevent rogue data provider system from connecting wherever they wish.

In an operation 1220, a determination is made concerning whether or not another data provider system is to connect. Identification of the data provider systems may be included in controller data maintenance table 420. If another data provider system is to connect, processing continues in an operation 1214. If another data provider system is not to connect, processing continues in operation 1222.

In operation 1222, the secretary thread notifies the data access system that the StartStream command was successful.

In an operation 1224, a determination is made concerning whether or not a block counter value is received from an accountant thread as discussed further below. If a block counter value is received, processing continues in an operation 1226. If a block counter value is not received, processing continues in operation 1224 to continue to wait for block counter values from accountant threads.

In operation 1226, the block counter value is stored in association with accountant thread information identifying the accountant thread. In an operation 1228, a determination is made concerning whether or not a block counter value is received from all of the accountant threads. If a block counter value is received from all of the accountant threads, processing continues in an operation 1230. If a block counter value is not received from all of the accountant threads, processing continues in operation 1224 to continue to wait for block counter values from accountant threads.

In operation 1230, a rebalancing across the accountant threads is computed. For example, a redistribution is determined for the plurality of stream nodes 106. For example, N may be defined as an average number of blocks per node across the stream nodes 106, i.e. the ideal block counter value. $N_i$ is a number of blocks on overburdened stream node i that has more than N blocks. C is the rebalancing tuning parameter field value that is a tunable proportionality constant that may be defined initially, for example, by a user. If a random number pulled from a pre-seeded uniform random number generator in the range [0, 1) is less than $1-\exp^{-C(N_i/N-1)}$, $N_i-N$ blocks are shifted to another stream node. C can be defined by specifying a probability of rebalancing, $P_R$, (e.g., 99%), which defines a value for $C(N_i/N-1)$ as $C=P_R(N-1)/N_i$. The value can be using a desired ratio of $N_i/N$ (e.g., 10). The probability of rebalancing, and the desired ratio may be input by a user or default values may be defined and used to compute C or the value of C may be input by a user or default values may be defined and used.

$N_a$ and $N_b$ are a number of blocks on underburdened stream nodes a and b, respectively. For example, underburdened stream nodes may be defined as stream nodes with less than N blocks. The blocks may be allocated to underburdened stream nodes by summing the underburdens $N-N_a$ and $N-N_b$. A random number in the range $[0, 2N-(N_a+N_b))$ is chosen, and the range into which it falls (e.g., $[0, N-N_a)$ or $[N-N_a, 2N-(N_a+N_b))$) determines which underburdened stream node a or b, respectively, is selected to alleviate the overburden of the overburdened stream node, and how many blocks are moved, $N-N_a$ or $N-N_b$. Once the blocks have been reallocated, the sums are updated across the remaining underburdened nodes, and a new range is chosen until there are no overburdened blocks remaining to redistribute. A variant could select a random number instead of using a fixed number of blocks.

In an operation 1232, the affected accountant threads are notified of the rebalancing, and processing continues in operation 1224. For example, a request to transfer block(s) is sent to those accountant threads from which blocks are requested to be sent to another accountant thread. The request to transfer block(s) includes a number of blocks to transfer and identification of an accountant thread to which to transfer the number of blocks.

Referring to FIG. 13, example operations associated with the started the analytic controller thread of controller 102 are described. Additional, fewer, or different operations may be performed depending on the embodiment. The order of presentation of the operations of FIG. 13 is not intended to be limiting. Although some of the operational flows are presented in sequence, the various operations may be performed in various repetitions, concurrently, and/or in other orders than those that are illustrated. As further understood by a person of skill in the art, various operations may be performed in parallel, for example, using a plurality of threads.

In an operation 1300, the analytic controller thread receives a notification that an accountant thread executing at a stream node of the plurality of stream nodes 106 is ready as discussed further below.

In an operation 1302, a determination is made concerning whether or not all accountants have indicated ready. If all accountants have indicated ready, processing continues in an operation 1304. If all accountants have not indicated ready, processing continues in operation 1300 to continue to receive the notifications. Identification of the accountants may be included in controller data maintenance table 420.

In operation 1304, the analytic controller thread sends the notice to accept data provider connections from the data provider systems 110 to the secretary thread.

In an operation 1306, a determination is made concerning whether or not a request for an analytic task is received. If a request for an analytic task is received, processing continues in an operation 1308. If a request for an analytic task is not received, processing continues in an operation 1324.

In operation 1308, a determination is made concerning whether or not an analytic task process is available for the requested analytic task. For example, a name of the requested analytic task may be used to search controller task hash table 422 for a prior creation of an analytic task process for the requested analytic task. If the analytic task process is available, processing continues in an operation 1319. If the analytic task process is not available, processing continues in an operation 1310.

In operation 1310, the analytic controller thread calls a Create( ) function defined for the analytic task. For example, the Create( ) function call may contain information such as a computing device location (stream node device or controller device 102), a number of nodes (the plurality of stream nodes 106 and controller device 102), and analytic task information such as a runtime configuration used for the analytic task to process properly. The Create( ) function creates a private structure and returns a pointer to the created private structure as an instance handle.

For illustration, a virtual function table may be used as part of registering (creating) an analytic task process. An analytics class may be created for the analytic task process. The analytics class may include function pointers that are responsive to certain events that can occur (e.g., new data received (APPEND), retiring data (RETIRE), rebalancing data (RECEIVE_IN, TRANSFER_OUT), etc.). Example functions as part of the analytics class include:

"NewData", which is called to process new streaming data when it is received;

"RetireData", which is called for data that is being retired or is expiring;

"Timer", which is called when a specified timer has expired to enforce a reporting frequency specified for the analytic task;

"SendData", which is called as part of rebalancing data when a block is transferred from the current stream node to another stream node of the plurality of stream nodes 106;

"ReceiveData", which is called as part of rebalancing data when a block is transferred to the current stream node from another stream node of the plurality of stream nodes 106;

"AddRequest", which is called to register a new request with an existing analytic task process;

"RemoveRequest", which is called to remove an active request and may return a use count, which may be used to determine when the analytic task process can be destroyed;

"Create", which is called to create or setup the analytic task process; and

"Destroy", which is called to destroy the analytic task process.

The structure returned from the factory has function pointers that indicate the events to which it responds or NULL if it doesn't respond to that event.

In an operation 1312, the analytic controller thread assigns a unique identifier (ID) to the created analytic task process.

In an operation 1314, the analytic controller thread stores the instance handle, received in response to the call to the Create( ) function defined for the analytic task process, in controller task hash table 522 in association with the assigned ID and a name of the analytic task process.

In an operation 1316, the analytic controller thread sends the request to the accountant threads executing at the plurality of stream nodes with the assigned ID and the name of the analytic task process.

In an operation 1318, the analytic controller thread starts a broadcaster thread or process to control a connection to the requesting data access system and initializes a structure with a Ready/Done event pair, a pointer/size pair, and a listener count. For example, one or more data access systems may be listening to the broadcast connection. The analytic controller thread passes the structure to the created analytics class. When a refresh is received, the analytic task process waits for "Done", checks for listeners, updates the pointer/size pair, if necessary, and sets "Ready".

A connection option is to stream updates back to the one or more data access systems through the existing socket. Another connection option is to open a new TCP port. The assigned ID may be related or unrelated to the port number, but the port number is unique to an analytic task process. For example, when the analysis starts, a port is opened on controller 102 to the requesting one or more data access systems. The analytic controller thread accepts incoming connections on this port, which may be a TCP port (to avoid firewall issues) on behalf of the analytic task process. The analytic controller thread streams results to listeners on this port. Alternately, the inbound side of the TCP connection can be used for control functions. However, additional authorization controls are needed on this port as well. Restricting the ability to control the connection to controller 102 and keeping the inbound channel from inputting a pre-shared key to begin streaming may be used in an illustrative embodiment.

The analytic result broadcaster, if a separate process, may also include security features such as control group and seccomp activation and may open a communication channel with the analytic controller thread and a port and generate authentication information such as a shared secret if it is not using user-specified or pre-generated information. If the port is dynamically assigned, the analytic result broadcaster returns the port number and security information to the analytic controller thread over the communication channel. When returning success information to the client after operation 1119 shown referring to FIG. 11, the analytic controller thread returns the port and security information.

In operation 1319, the analytic controller thread selects the instance handle for the analytic task from controller task hash table 522, and processing continues in an operation 1320.

In operation 1320, the analytic controller thread calls the AddRequest( ) function defined for the analytic task process, which increments a counter indicating a number of requests for the analytic task process. The AddRequest( ) function defines the individual analytic requested. The Add Request( ) function call may include the instance handle and instance information identifying options for this request. For example, an "Average" analytic task may generate 2 second and 5 second averages based on two different and separate analytic requests though each uses the same analytic task. The AddRequest( ) function allocates a private structure with its configuration information and uses a programming interface internal to controller application 411 to add a sequence of commands to a command queue that performs an initial analytic computation using existing data in controller data blocks 418.

In an operation 1321, the analytic controller thread assigns a second unique ID to the request.

In an operation 1322, the analytic controller thread stores a request handle returned from the AddRequest( ) function in controller request hash table 424 in association with the assigned second ID. For example, the request handle may be a pointer to the private structure allocated by the Add Request( ) function.

In an operation 1323, the analytic controller thread sends the request handle to all of the accountant threads with the assigned second ID. The analytic controller sends the request information to the accountant threads so that each can perform the same operation, though at the node level. In an illustrative embodiment, the request handle is an opaque pointer (void*). The assigned second ID associated with the request is included, so that each accountant thread has the same request for the same ID.

In operation 1324, a determination is made concerning whether or not a notification of data changes is received from a stream node. If a notification of data changes is received from a stream node, processing continues in an operation 1326. If a notification of data changes is not received from a stream node, processing continues in operation 1306. The corresponding analytic task process executing at controller 102 is notified of the update, for example, using MPI asynchronous communications, windows, remote direct memory access, etc.

In operation 1326, the analytic controller thread calls the NewData( ) function defined for the analytic task process with the data changes. The NewData( ) function may perform any additional processing on the data changes to compute an update. As another option, the NewData( ) function may generate a command with associated data that is added to a command queue and executed by another thread in a manner similar to that described for analytic threads of stream nodes 106 below.

In an operation 1328, the analytic controller thread sends the update to the requesting data access system using the started thread, and processing continues in operation 1306. The analytic result broadcaster listens to the opened port for connections. The analytic result broadcaster also receives analytic results from running analytic task processes through an internal application interface. The analytic result broadcaster authenticates data access system connectors and, once they are authenticated, begins sending results specified by the data access system by the second ID associated with the request as they are provided by the analytic routines either as the results arrive or on a fixed schedule.

Figure 14:
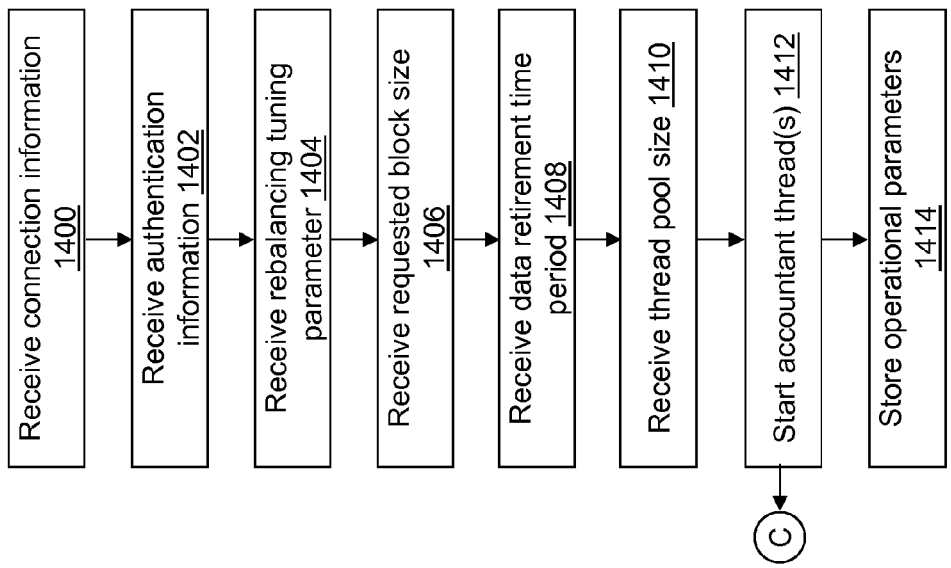
FIG. 14 depicts a flow diagram illustrating examples of operations performed by the computing device of the plurality of stream nodes of FIG. 5 in accordance with an illustrative embodiment.

Referring to FIG. 14, example operations associated with stream processing application 511 of stream node 500 are described. Additional, fewer, or different operations may be performed depending on the embodiment. The order of presentation of the operations of FIG. 14 is not intended to be limiting. A user can interact with one or more user interface windows presented to the user in a display at a data access system, which triggers different functionality of stream processing application 511 executing at stream node 500. Similarly, a user can interact with one or more user interface windows presented to the user in a display at a data provider computing device, which triggers different functionality of stream processing application 511 executing at stream node 500. Although some of the operational flows are presented in sequence, the various operations may be performed in various repetitions, concurrently, and/or in other orders than those that are illustrated. As further understood by a person of skill in the art, various operations may be performed in parallel, for example, using a plurality of threads. For illustration, stream processing application 511 may be executing on a main thread of stream node 500. Stream processing application 511 may be executing at each stream node 500 of the plurality of stream nodes 106.

In an operation 1400, connection information is received. In an operation 1402, authentication information is received. In an operation 1404, a value of a rebalancing tuning parameter is received. In an operation 1406, a value of a requested block size is received. In an operation 1408, a value of a data retirement time period is received. In an operation 1410, a value of a thread pool size is received.

The received information and values may be entered as options with the command, may be default values stored on third computer-readable medium 508 or on another computer-readable medium accessible through third communication interface 506, may be entered in response to a query for a value presented in the display possibly using one or more user interface windows, etc. Example connection information may include data provider port numbers. Example authentication information may include keys or challenge/response secrets. The received information and values may be stored in a data structure stored in data maintenance table 520.

In an operation 1412, one or more accountant threads are started, for example, to perform data maintenance operations. FIGS. 15-19 depict example operations performed by the started accountant thread(s). The processing described by FIGS. 15-19 may be performed by one or more separate threads.

In an operation 1414, thread information and notification/synchronization methods such as shared memory regions and locks related to the accountant thread(s) are stored in the data structure stored in data maintenance table 520.

Controller data maintenance table 420 and data maintenance table 520 are "shared" because they have the same data structure on controller 102 and each stream node of the plurality of stream nodes 106. Fields of the data structure (operational parameters) are populated depending on what role the computing device is performing, e.g., controller or stream node. Items stored in each data structure may include:
  Thread ID and communication information for the secretary thread (set to NULL if not controller device 102);
  Thread ID and communication information for the analytic controller thread (set to NULL if not controller device 102);

Thread ID and communication information for the accountant thread (set to NULL if not a stream node);

Regularizer process port number (zero if not a stream node);

Secretary thread connection port (zero if not controller device 102);

Authentication/authorization information for the secretary thread (empty if not controller device 102);

Data retirement time period (e.g., 10 seconds);

Requested block size;

Client connection information (e.g. listening socket);

Rebalancing tuning parameter;

Regularizer connection information (e.g. process ID and connection socket);

Thread pool size for the accountant thread to maintain in the thread pool; and

Optional transformation information for the regularizer processes. This may include constraints to be maintained (e.g. value must be within a specified range or take on a specific value), default value if a variable isn't specified when coming in from a data provider system, variables to be renamed to match. This further may include user-specified transformations (e.g. applying a set of mathematical operations on a variable or set of variables) stored as an abstract syntax tree, virtual machine bytecode, native code, etc.

Figure 15:
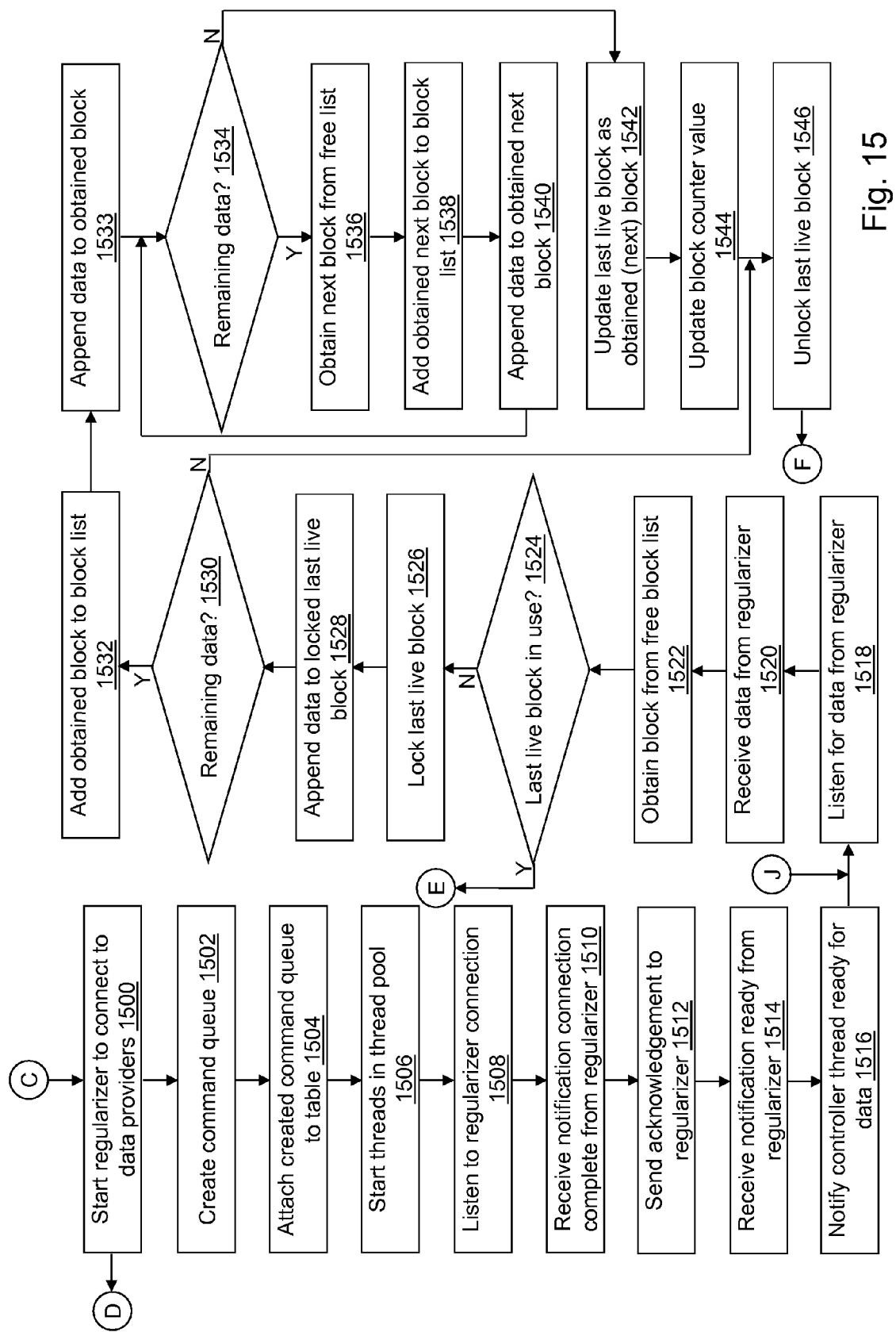
FIGS. 15-19 depict flow diagrams illustrating examples of operations performed by an accountant thread executing at the computing device of the plurality of stream nodes of FIG. 5 in accordance with an illustrative embodiment.

Referring to FIG. 15, example operations associated with the started accountant thread(s) of each stream node are described. Additional, fewer, or different operations may be performed depending on the embodiment. The order of presentation of the operations of FIG. 15 is not intended to be limiting. Although some of the operational flows are presented in sequence, the various operations may be performed in various repetitions, concurrently, and/or in other orders than those that are illustrated. As further understood by a person of skill in the art, various operations may be performed in parallel, for example, using the one or more threads.

Figure 20:
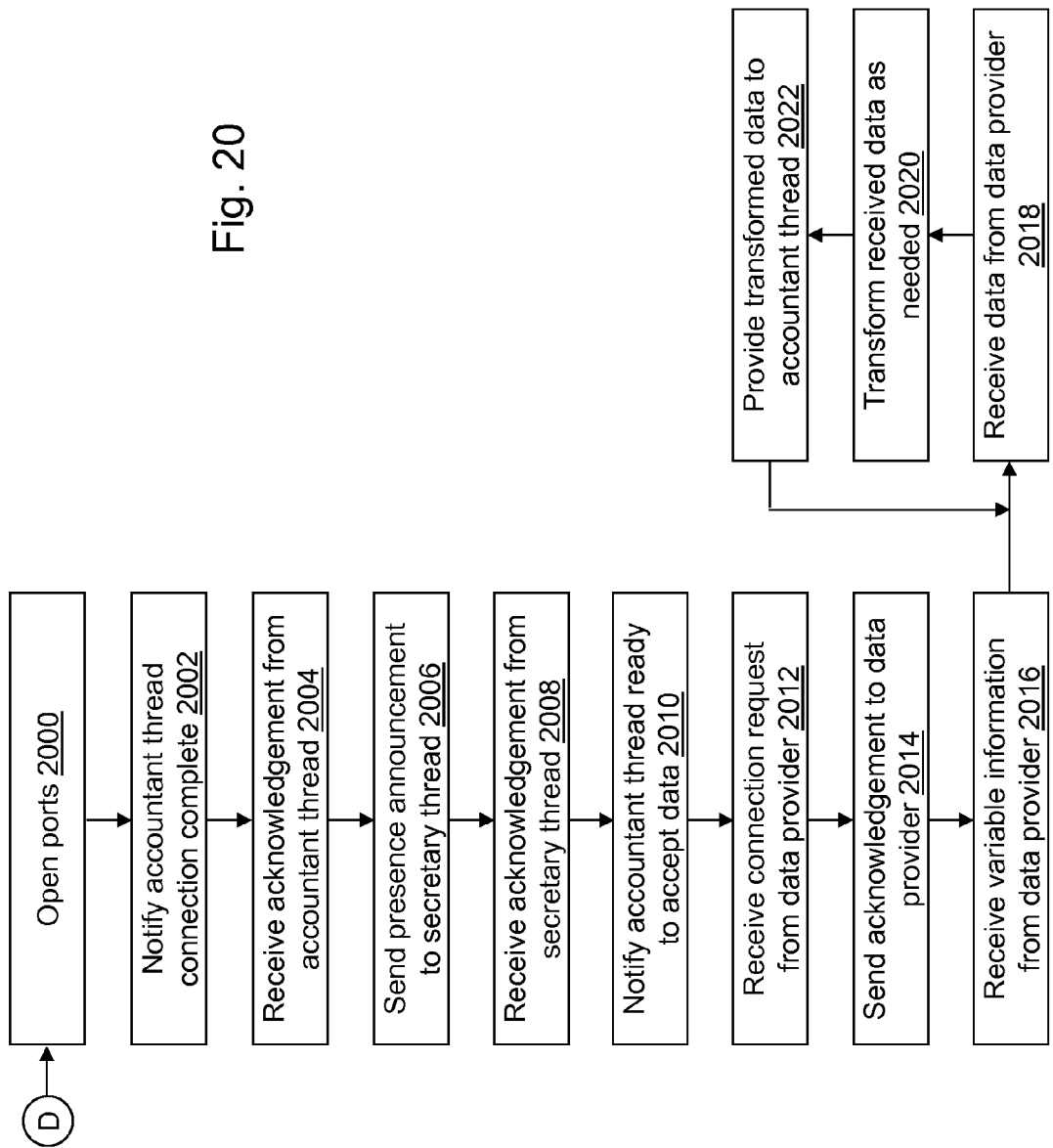
FIG. 20 depicts a flow diagram illustrating examples of operations performed by a regularizer process executing at the computing device of the plurality of stream nodes of FIG. 5 in accordance with an illustrative embodiment.

In an operation 1500, the accountant thread starts a regularizer process to connect at least one data provider system of data provider systems 110 to the stream node. FIG. 20 depicts example operations performed by the started regularizer process. The regularizer process may be a separate process with lower operating privileges or with secure computing enabled.

In an operation 1502, the accountant thread creates a command queue. In an operation 1504, the created command queue is attached to data maintenance table 520.

Figure 21:
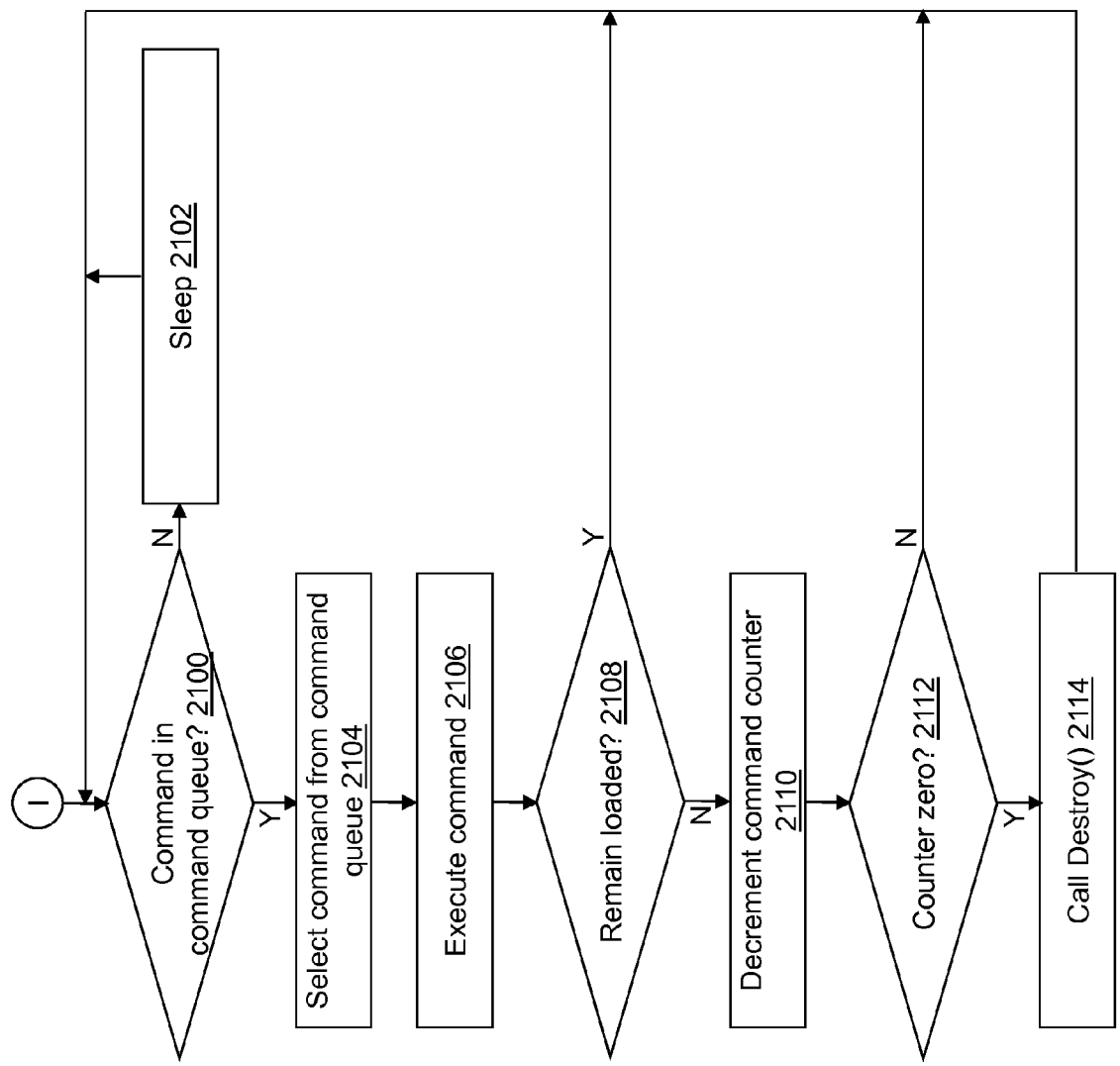
FIG. 21 depicts a flow diagram illustrating examples of operations performed by an analytic thread executing at the computing device of the plurality of stream nodes of FIG. 5 in accordance with an illustrative embodiment.

In an operation 1506, the accountant thread starts a number of threads defined by the thread pool size operational parameter field value. FIG. 21 depicts example operations performed by the started regularizer process.

In an operation 1508, the accountant thread listens for connections on a regularizer port or other inter-process communication system such as unix domain sockets, pipes, or shared memory. The regularizer process connection information is contained in the operational parameters fields attached to data maintenance table 520. In an operation 1510, the accountant thread receives a notification of a connection complete from the started regularizer process. In an operation 1512, the accountant thread sends an acknowledgement to the started regularizer process. In an operation 1514, the accountant thread receives a notification that the started regularizer process is ready to accept data. In an operation 1516, the accountant thread sends a notification that the accountant thread is ready.

In an operation 1518, the accountant thread listens for receipt of data through the regularizer connection. In an operation 1520, data is received from the regularizer process through the regularizer connection. Data generation device 800, the associated data provider system, and the regularizer process may include a timestamp field within data 816, data 926, and data blocks 518 as the data is streamed from data generation device 800 to the associated data provider system and to the regularizer process. For example, these fields may be named InputTime (data generation device 800), ShippedTime (associated data provider system), ReceivedTime (regularizer process). These fields may be renamed by the regularizer process as specified by the transformation information operational parameter field value defined for the regularizer process. An automatic DataReceived variable in data maintenance table 520 may provide a millisecond-resolution timestamp provided by the accountant thread when data is inserted or appended into a block of data blocks 518.

In an operation 1522, the accountant thread obtains a block of data blocks 518 from a free block list maintained by the accountant thread. The free block list may be a singly or a doubly linked list as understood by a person of skill in the art. A pointer to the free block list may be maintained in data maintenance table 520. The accountant thread may obtain a pointer to the block of data that has a block size as defined by the requested block size operational parameter field value. When a block is retrieved from the free block list, the buffer pointer in the block is reset to point to the beginning of the memory allocated to the block. If no blocks on the free block list are no longer in use, a new set of blocks is created. The first block is used, and the rest are put on the free block list.

When a block is obtained from the free block list, it is assigned an ID value from a global counter. The global counter may be an array of integers. If rollover occurs, a new integer is allocated and set to one, and the counter continues so that the analytic threads know which blocks are new since block IDs are monotonically increasing.

In operation 1524, a determination is made concerning whether or not a last live block is in use (e.g., a read/write lock is set). If the last live block is in use, processing continues in an operation 1600 shown referring to FIG. 16. If the last live block is not in use, processing continues in an operation 1526.

In operation 1526, the accountant thread sets write lock on the last live block. For example, a last live block pointer may be stored in data maintenance table 520 that points to a location of the last live block in third computer-readable medium 508. While the accountant thread holds the block's read or write lock, the accountant thread may add transaction information to the block for commands in the command queue to recognize the state of the block at the moment the command was issued.

In an operation 1528, the accountant thread appends the received data to the locked last live block. In operation 1530, a determination is made concerning whether or not the received data exceeds the remaining memory allocated to the locked last live block. If the received data exceeds the remaining memory, processing continues in an operation 1532. If the received data does not exceed the remaining memory, processing continues in an operation 1546.

In operation 1532, the accountant thread adds the obtained block to a block list. The block list may be a doubly linked list as understood by a person of skill in the art. In an operation 1533, the accountant thread appends, to the obtained block, at least a portion of the received data that exceeds the remaining memory allocated to the locked last live block. In an operation 1534, a determination is made concerning whether or not there is remaining data of the received data that exceeds the memory allocated to the obtained block. If the remaining data exceeds the memory allocated to the obtained block, processing continues in an operation 1536. If the remaining data does not exceed the memory allocated to the obtained block, processing continues in an operation 1542.

In operation 1536, the accountant thread obtains a next block of data blocks 518 from the free block list. In operation 1538, the accountant thread adds the next block to the block list. In an operation 1540, the accountant thread appends at least a portion of the remaining data of the received data to the next block.

In operation 1542, the accountant thread updates the last live block as the obtained block or the obtained next block. For example, the accountant thread updates the last live block pointer to point to the last block to which the received data was appended which may be a location of the obtained block or a location of the obtained next block. In an operation 1544, a block counter value is updated based on a number of blocks added to the block list in just executed operations 1532 and 1538. The block counter value may be stored in data maintenance table 520 to indicate a number of blocks currently included in the block list.

Figure 17:
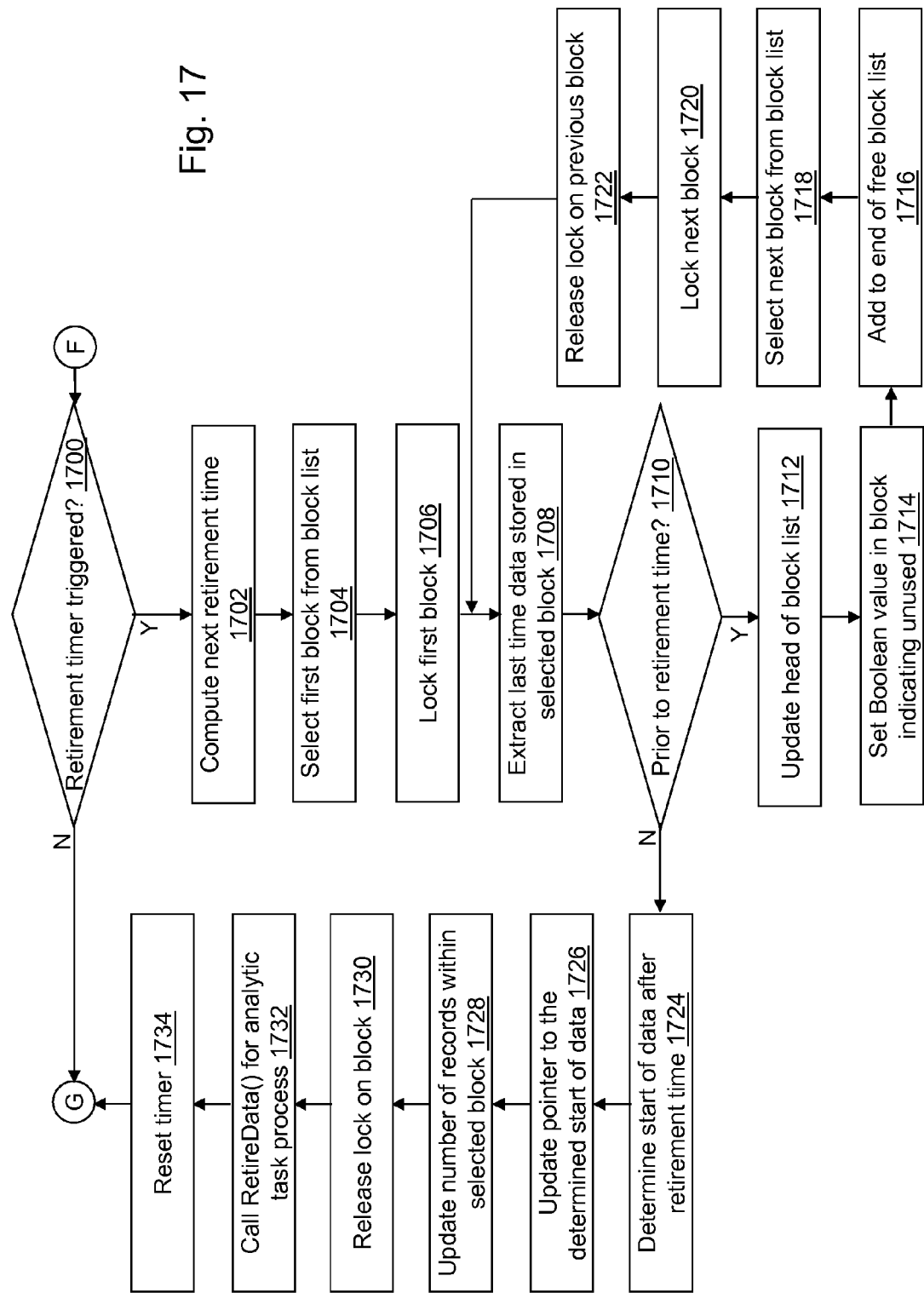

In operation 1546, the accountant thread unlocks the last live block, and processing continues in an operation 1700 shown referring to FIG. 17.

Figure 16:
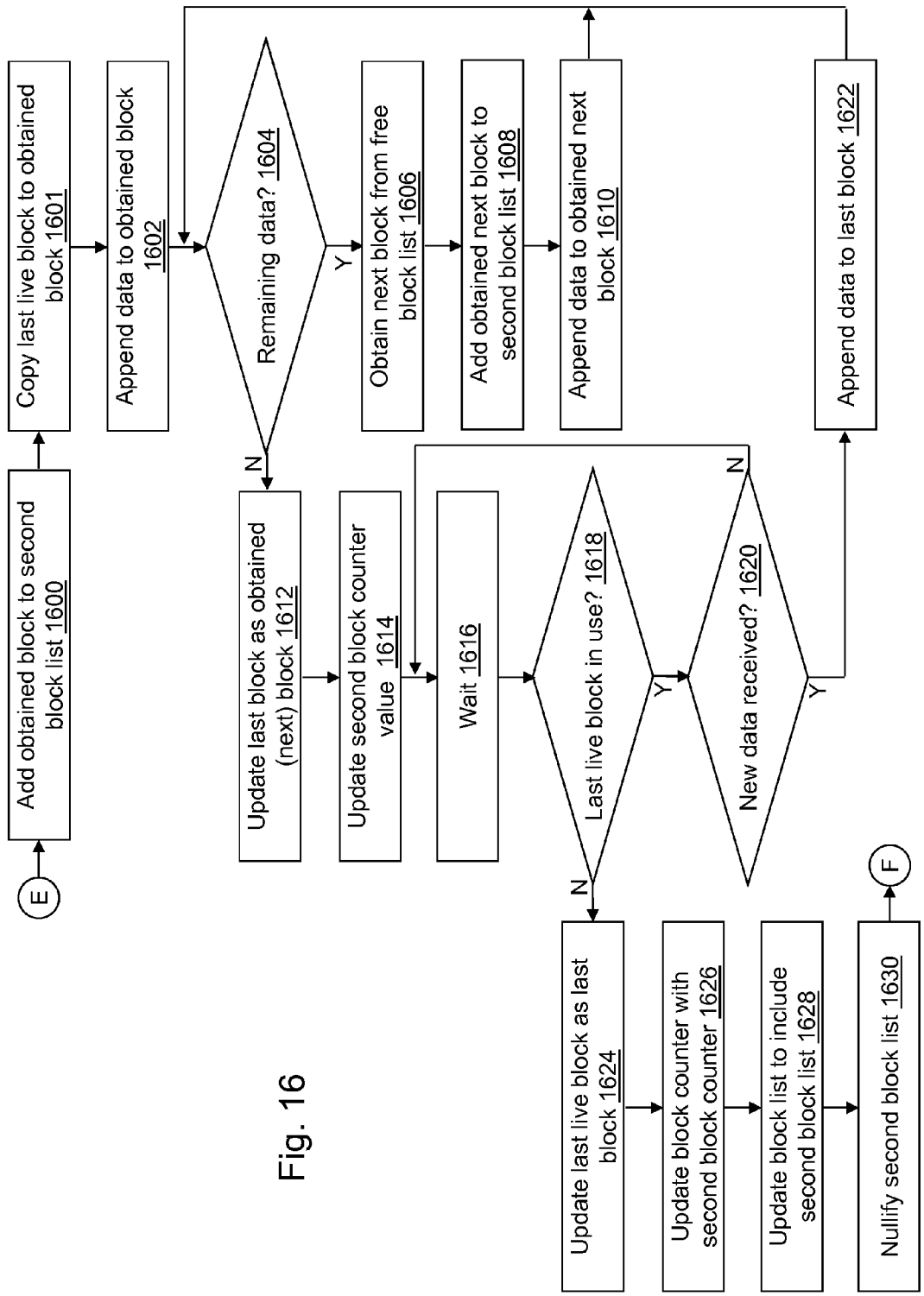

Referring to FIG. 16, additional example operations associated with the started accountant thread(s) of each stream node are described. Additional, fewer, or different operations may be performed depending on the embodiment. The order of presentation of the operations of FIG. 16 is not intended to be limiting. Although some of the operational flows are presented in sequence, the various operations may be performed in various repetitions, concurrently, and/or in other orders than those that are illustrated. As further understood by a person of skill in the art, various operations may be performed in parallel, for example, using the one or more threads.

In an operation 1600, the accountant thread adds the obtained block to a second block list. The second block list may be a doubly linked list as understood by a person of skill in the art. In an operation 1601, the accountant thread copies the last live block to the block obtained in operation 1522.

In an operation 1602, the accountant thread appends the received data to the obtained block. In operation 1604, a determination is made concerning whether or not the received data exceeds the memory allocated to the obtained block. If the received data exceeds the memory allocated to the obtained block, processing continues in an operation 1606. If the received data does not exceed the memory allocated to the obtained block, processing continues in an operation 1612.

In operation 1606, the accountant thread obtains a next block of data blocks 518 from the free block list. In an operation 1608, the accountant thread adds the next block to the second block list. In an operation 1610, the accountant thread appends at least a portion of the remaining data of the received data to the obtained next block, and processing continues in operation 1604.

In operation 1612, the accountant thread updates the last block as the obtained block or the obtained next block. For example, the accountant thread updates the last block pointer to point to the last block to which the received data was appended which may be a location of the obtained block or a location of the obtained next block. In an operation 1614, a second block counter value is updated based on a number of blocks added to the second block list in just executed operations 1600 and 1608. The second block counter value may be stored in data maintenance table 520 to indicate a number of blocks currently included in the second block list.

In an operation 1616, the accountant thread waits until either the last live block is no longer in use or until new data arrives in operation 1520.

In operation 1618, a determination is made concerning whether or not the last live block is in use. If the last live block is in use, processing continues in an operation 1620 shown referring to FIG. 16. If the last live block is not in use, processing continues in an operation 1624.

In operation 1620, a determination is made concerning whether or not new data has arrived in operation 1520. If new data has arrived in operation 1520, processing continues in an operation 1622. If new data has not arrived in operation 1520, processing continues in operation 1616 to continue to wait until either the last live block is no longer in use or until new data arrives in operation 1520.

In operation 1622, the accountant thread appends the received data to a last obtained block from operation 1522 or from operation 1606, and processing continues in operation 1604 to continue to add any remaining data to the second block list.

In operation 1624, the accountant thread updates the last live block as the last block. For example, the accountant thread updates the last live block pointer to have the pointer value of the last block pointer. In an operation 1626, the accountant thread updates the block counter value based on the second block counter value. For example, the second block counter value is added to the block counter value because the blocks on the second block list have been added to the block list.

In an operation 1628, the accountant thread updates the block list to include the second block list. In an operation 1630, the accountant thread nullifies the second block list, and processing continues in operation 1700 shown referring to FIG. 17. For example, the accountant thread nullifies the second block list by setting the second block list head to a null value, setting the last block pointer to a null value, and setting the second block counter value to zero.

Referring to FIG. 17, additional example operations associated with the started accountant thread(s) of each stream node are described. The example operations of FIG. 17, support retirement of blocks in data blocks 518. Additional, fewer, or different operations may be performed depending on the embodiment. The order of presentation of the operations of FIG. 17 is not intended to be limiting. Although some of the operational flows are presented in sequence, the various operations may be performed in various repetitions, concurrently, and/or in other orders than those that are illustrated. As further understood by a person of skill in the art, various operations may be performed in parallel, for example, using the one or more threads.

In operation 1700, a determination is made concerning whether or not a retirement timer associated with an analytic task process is triggered. If a retirement timer associated with an analytic task process is triggered, processing continues in an operation 1702. If a retirement timer associated with an analytic task process is not triggered, processing continues in an operation 1800 shown referring to FIG. 18.

In operation 1702, the accountant thread computes a next retirement time. For example, the next retirement time may be computed as a current time minus the data retirement time period operational parameter field value. Instead of the data retirement time period operational parameter field value, a longest analytic task process timer value may be used to compute the next retirement time if the longest analytic task process timer value is larger than the data retirement time period operational parameter field value.

In an operation 1704, the accountant thread selects a first block from the block list, for example, using a pointer to the block saved as a head of the block list.

In an operation 1706, the accountant thread sets a read lock on the selected first block. In an operation 1708, the accountant thread extracts a last time data was stored in the selected first block from the selected first block. For example, the accountant thread extracts a value of the DataReceived variable stored in data maintenance table 520 for the selected first block.

In operation 1710, a determination is made concerning whether or not the extracted last time is prior to the computed retirement time. If the extracted last time is prior to the computed retirement time, processing continues in an operation 1712. If the extracted last time is not prior to the computed retirement time, processing continues in an operation 1724.

In operation 1712, the accountant thread updates the head of the block list to a next block in the block list. In an operation 1714, the accountant thread sets a Boolean value in the selected block to indicate the block is no longer in use (block is unused). In an operation 1716, the accountant thread adds the selected block to an end of the free block list.

In an operation 1718, the accountant thread selects a next block from the block list. In an operation 1720, the accountant thread sets a read lock on the selected next block. In an operation 1722, the accountant thread release the set read lock on the selected block, and processing continues in operation 1708 to determine if all or a portion of the selected next block can be retired.

In operation 1724, the accountant thread determines a start of data in the selected (first or next) block that was stored after the computed retirement time. For example, the accountant thread reads a value of the ReceivedTime variable stored in the selected first block for each record. A buffer pointer parameter, a number of records parameter, a first byte parameter, and a finished parameter may be stored in each block of data block(s) 520. The buffer pointer parameter points to a first live (non-retired) record (start of data) in the block. The number of records parameter defines a number of live records remaining in the block. The first byte parameter points to a first byte of memory allocated for the block. Because the buffer pointer parameter is adjusted to narrow the block as data expires, the first byte parameter tracks the original memory allocation for freeing or reusing the memory later. The finished parameter indicates when the analytic task processes are finished with the block.

In an operation 1726, the accountant thread updates buffer pointer parameter to a first record in the selected (first or next) block that was stored after the computed retirement time. In an operation 1728, the accountant thread updates number of records parameter for the selected (first or next) block based on a number of records in the selected (first or next) block that were stored after the computed retirement time.

In an operation 1730, the accountant thread releases the lock on the previous block (first or next).

In an operation 1732, the accountant thread calls the RetireData( ) function defined for the analytic task process, which handles processing by the analytic process in association with retiring the data blocks and triggering of the timer. For example, a statistical quantity may be recomputed based on the remaining block of data blocks 518. In an asynchronous mode, the RetireData( ) function defined for the analytic task process generates commands and adds the generated commands to the command queue to perform the computation.

Figure 18:
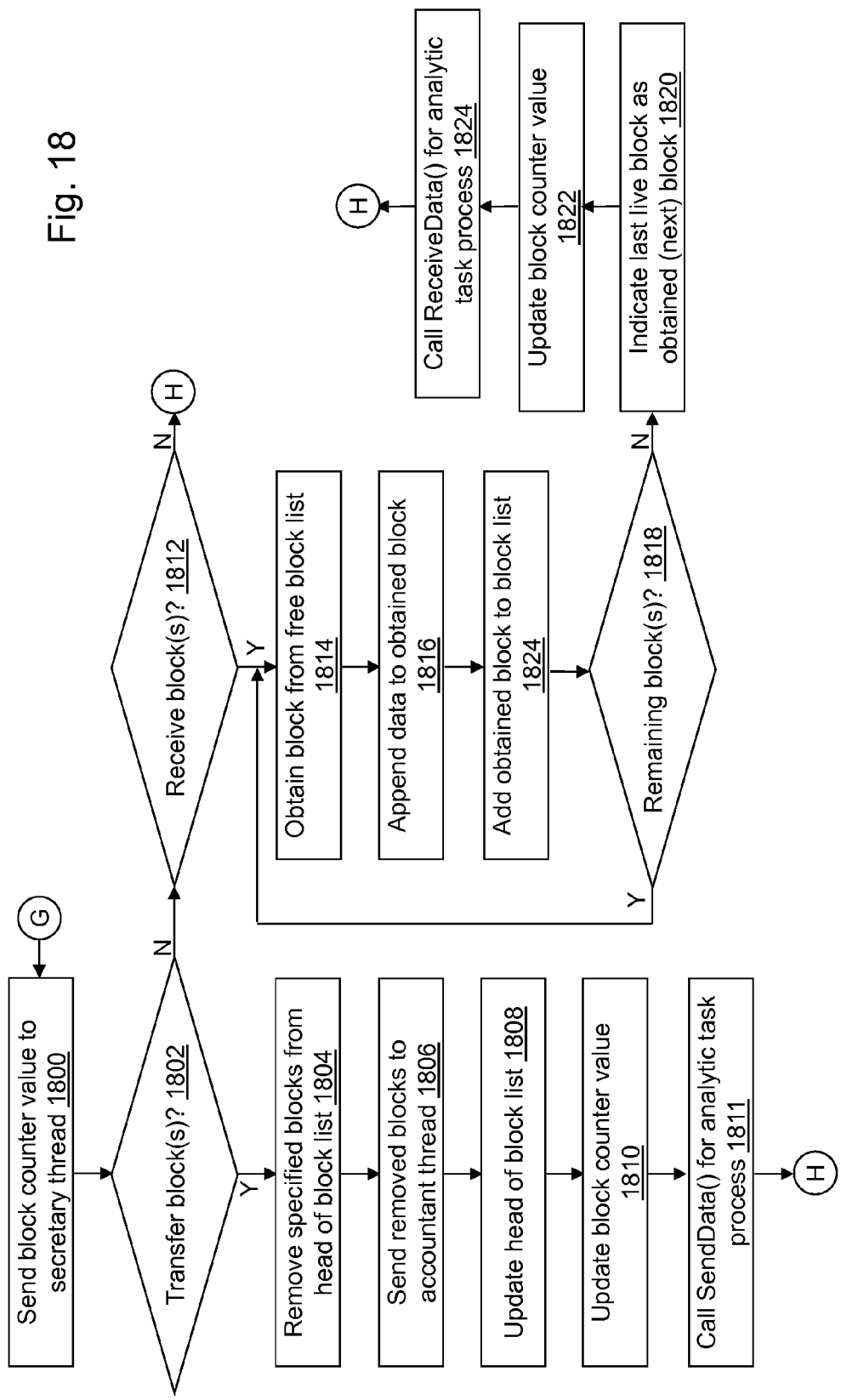

In an operation 1734, the accountant thread resets the timer based on the data retirement time period operational parameter field value or the longest analytic task process timer value, whichever is longer, and processing continues in operation 1800 shown referring to FIG. 18.

Retired blocks may be saved to disk upon retirement. If retired blocks are to be saved to disk upon retirement, the blocks are appended to a "retiring" parameter stored in data maintenance table 418. The "retiring" parameter maintains a singly-linked list of retired blocks, which are to be saved and recycled.

Referring to FIG. 18, additional example operations associated with the started accountant thread(s) of each stream node are described. The example operations of FIG. 18, support balancing of blocks between the plurality of stream nodes 106. Additional, fewer, or different operations may be performed depending on the embodiment. The order of presentation of the operations of FIG. 18 is not intended to be limiting. Although some of the operational flows are presented in sequence, the various operations may be performed in various repetitions, concurrently, and/or in other orders than those that are illustrated. As further understood by a person of skill in the art, various operations may be performed in parallel, for example, using the one or more threads.

In operation 1800, the accountant thread sends the block counter value to the secretary thread.

In an operation 1802, a determination is made concerning whether or not a request to transfer block(s) is received from the secretary thread. If a request to transfer block(s) is received from the secretary thread, processing continues in an operation 1804. If a request to transfer block(s) is not received from the secretary thread, processing continues in an operation 1812.

In operation 1804, the accountant thread removes a number of blocks to transfer from the head of the block list. The number of blocks to transfer is included in the request to transfer. The oldest active data may be selected for redistribution between nodes of stream nodes 106, because older data is less important for running analyses.

In an operation 1806, the accountant thread sends the removed blocks to the accountant thread indicated with the request to transfer. In an operation 1808, the accountant thread updates the head of the block list to point to the first remaining block after removing the number of blocks to transfer from the head of the block list. In an operation 1810, the accountant thread updates the block counter value based on the removed blocks. For example, the number of blocks to transfer is deducted from a current value of the block counter value.

Figure 19:
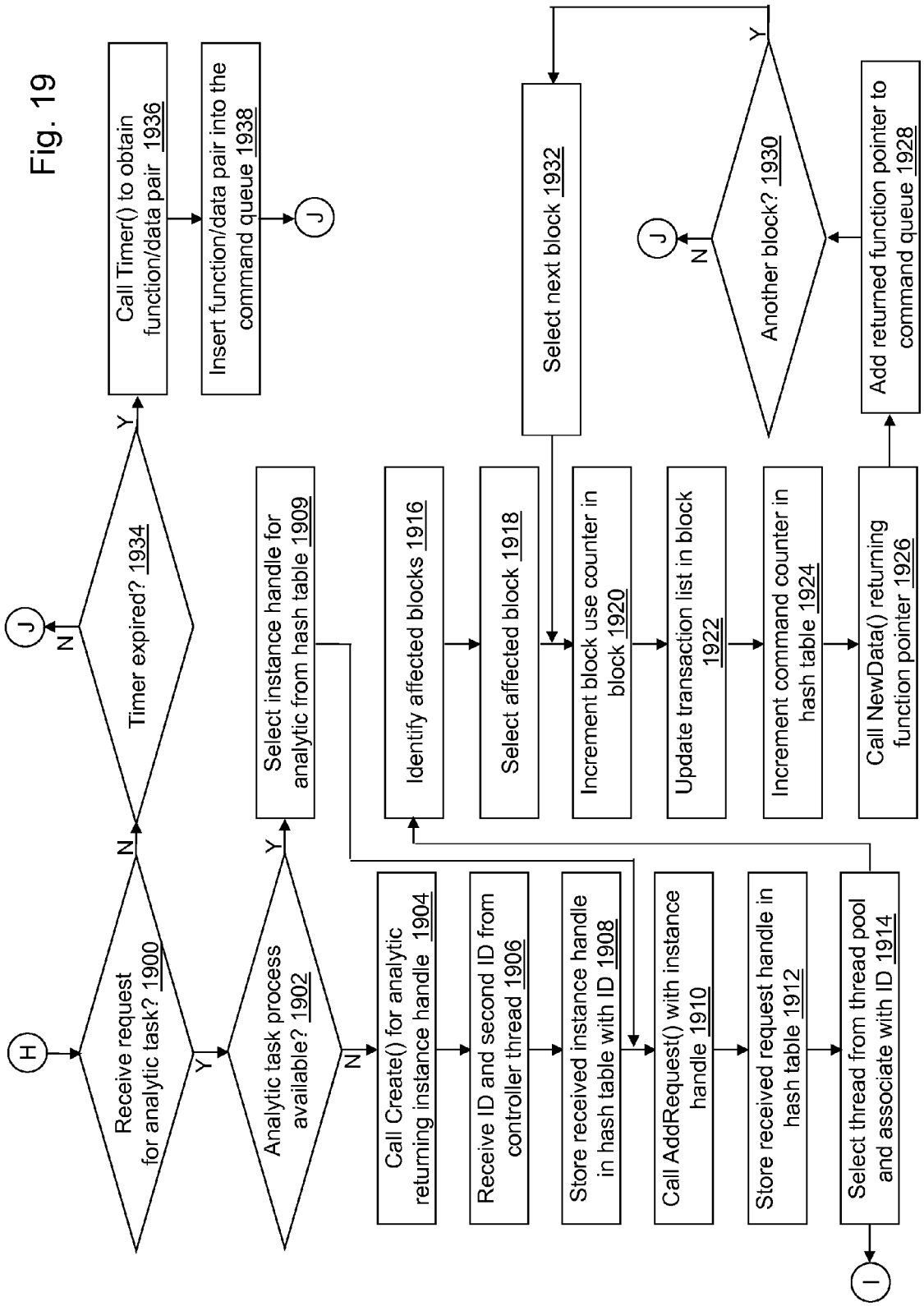

In an operation 1811, in a synchronous mode, the accountant thread calls the Send Data( ) function defined for the analytic task process, which handles processing by the analytic process in association with sending of blocks to another accountant thread, and processing continues in an operation 1900 shown referring to FIG. 19. For example, a statistical quantity may be recomputed based on the remaining block of data blocks 518. In an asynchronous mode, the SendData( ) function defined for the analytic task process generates commands and adds the generated commands to the command queue to perform the computation.

In operation 1812, a determination is made concerning whether or not one or more blocks are received from another accountant thread of the plurality of stream nodes 106. If one or more blocks are received from another accountant thread, processing continues in an operation 1814. If one or more blocks are not received from another accountant thread, processing continues in operation 1900 shown referring to FIG. 19.

In operation 1814, the accountant thread obtains a block of data blocks 518 from the free block list. In an operation 1816, the accountant thread appends at least a portion of the received one or more blocks to the obtained block. In an operation 1818, the accountant thread adds the obtained block to the block list.

In operation 1818, a determination is made concerning whether or not any blocks of the received one or more blocks remain. If any blocks of the received one or more blocks remain, processing continues in an operation 1814 to continue to add additional blocks to the block list. If any blocks of the received one or more blocks do not remain, processing continues in an operation 1820.

In operation 1820, the accountant thread updates the last live block as the last obtained block. In an operation 1822, the block counter value is updated based on the number of blocks added to the block list.

In an operation 1824, in a synchronous mode, the accountant thread calls the ReceiveData( ) function defined for the analytic task process, which handles processing by the analytic process in association with receiving blocks from another accountant thread, and processing continues in an operation 1900 shown referring to FIG. 19. For example, a statistical quantity may be recomputed to include the newly received blocks. In an asynchronous mode, the ReceiveData( ) function defined for the analytic task process generates commands and adds the generated commands to the command queue to perform the computation.

Referring to FIG. 19, additional example operations associated with the started accountant thread(s) of each stream node are described. The example operations of FIG. 19, support execution of analytic task processes. Additional, fewer, or different operations may be performed depending on the embodiment. The order of presentation of the operations of FIG. 19 is not intended to be limiting. Although some of the operational flows are presented in sequence, the various operations may be performed in various repetitions, concurrently, and/or in other orders than those that are illustrated. As further understood by a person of skill in the art, various operations may be performed in parallel, for example, using threads.

In operation 1900, a determination is made concerning whether or not a request for an analytic task is received. If a request for an analytic task is received, processing continues in an operation 1902. If a request for an analytic task is not received, processing continues in an operation 1934.

In operation 1902, a determination is made concerning whether or not an analytic task process is available for the requested analytic task. For example, a name of the requested analytic task may be used to search task hash table 522 for a prior creation of an analytic task process for the requested analytic task. If the analytic task process is available, processing continues in an operation 1909. If the analytic task process is not available, processing continues in an operation 1904.

In operation 1904, the accountant thread calls a Create( ) function defined for the analytic task that creates a private structure and returns a pointer to the created private structure as an instance handle.

In an operation 1906, the accountant thread receives the unique ID and the unique second ID from the analytic controller thread. The unique ID and the unique second ID may be received in separate communications. In an operation 1908, the accountant thread stores the instance handle received in response to the call to the Create( ) function defined for the analytic task process, in task hash table 522 in association with the received unique ID.

In operation 1909, the accountant thread selects the instance handle for the analytic task from task hash table 522, and processing continues in an operation 1910.

In operation 1910, the accountant thread calls the AddRequest( ) function defined for the analytic task process, which increments a counter indicating a number of requests for the analytic task process. The AddRequest( ) function defines the individual analytic requested. The AddRequest( ) function call may include the instance handle and instance information identifying options for this request. The AddRequest( ) function allocates a private structure with its configuration information and uses an internal interface to add a command to a command queue that performs an analytic computation using existing data in data blocks 518.

In an operation 1912, the accountant thread stores a request handle returned from the AddRequest( ) function in request hash table 524 in association with the received second ID.

In an operation 1914, the accountant thread selects a thread from the thread pool and associates it with the received second ID. As another option, no thread is selected and associated with the unique ID. Instead, the command queue is connected to the thread pool that selects a task from the command queue and executes it. FIG. 21 depicts example operations performed by the thread pool.

In an operation 1916, the accountant thread identifies affected blocks on the block list. For example, when an event occurs, every block that it occurs in is identified.

In an operation 1918, the accountant thread selects a first affected block from the affected blocks. In an operation 1920, the accountant thread increments a block use count for the selected affected block. In an operation 1922, the accountant thread updates a transaction list in the selected affected block. When the accountant thread or other responsible thread (e.g., retirer, rebalancer) complete their operations, they may save the necessary prior information on the block state at that moment along with a thread-assigned ID and transaction type into the list of transactions on that block.

In an operation 1924, the accountant thread increments a command counter stored with the request handle in request hash table 524. In an operation 1926, the accountant thread calls the NewData( ) function defined for the analytic task process, which handles processing by the analytic process. A pointer to the selected affected block (which won't be retired until the command execution completes because the use count is incremented) and the request handle may be input to the NewData( ) function. The NewData( ) function returns a function pointer and private data that are suitable to be put into the command queue.

In an operation 1928, the accountant thread adds the returned function pointer to the command queue. Commands in the command queue are of the form:
function pointer containing the operation for a thread in the thread pool to perform;
private data for the function;
pointer to the request handle and command counter;
transaction ID;
transaction type; and
pointer to the block the command is to operate on.

The first two are provided by the NewData( ) function. The transaction ID and type are determined by the accountant thread. Possible transaction types include APPEND, RETIRE, RECEIVE_IN, TRANSFER_OUT, and PROCESS and are associated with different events. APPEND may be used for new data received from the associated regularizer process. RETIRE may be used for retiring data. RECEIVE_IN may be used for new data received from another accountant thread. TRANSFER_OUT may be used for data sent to another accountant thread. PROCESS may be used for initial processing and timer events. The transaction ID and type together allow the command being executed to identify the state of the block when the command was issued to avoid possible ordering issues. The transaction list can be dealt with two ways: one is to simply allocate a fixed number of transaction information structures (perhaps using an array and use count). If the number is exceeded, new transaction information structures can be allocated in a thread-safe fashion. Alternately, each block could have a small memory allocator (such as a memory pool) of its own to handle allocations within the block.

In an operation 1930, a determination is made concerning whether or not another affected block is identified in the affected blocks. If another affected block is identified in the affected blocks, processing continues in an operation 1932. If another affected block is not identified in the affected blocks, processing continues in operation 1518 to continue processing data from the regularizer process. In operation 1932, the accountant thread selects a next affected block from the affected blocks, and processing continues in operation 1920.

In operation 1934, a determination is made concerning whether or not a timer has expired for an analytic task process. If a timer has expired for an analytic task process, processing continues in an operation 1936. If a timer has not expired for an analytic task process, processing continues in operation 1518 to continue processing data from the regularizer process.

In operation 1936, the analytic task's Timer( ) function is called to obtain a function/data pair. In an operation 1938, the obtained function/data pair is inserted into the command queue without an associated block. Processing continues in operation 1518 to continue processing data from the regularizer process.

Referring to FIG. 20, example operations associated with the started regularizer process of stream node 500 are described. Additional, fewer, or different operations may be performed depending on the embodiment. The order of presentation of the operations of FIG. 20 is not intended to be limiting. Although some of the operational flows are presented in sequence, the various operations may be performed in various repetitions, concurrently, and/or in other orders than those that are illustrated. As further understood by a person of skill in the art, various operations may be performed in parallel, for example, using a plurality of threads. In an alternative embodiment, the started regularizer process may be split into two different threads, one for handling data blocks from data provider systems 110 and the other for performing operations. Though not required, use of two different threads allows the regularizer processes to be as dedicated as possible.

In an operation 2000, the regularizer process reduces its privileges to only those necessary for operation (e.g. using Linux control groups). It also opens ports passed, for example, using environment variables or arguments from the accountant thread, contained in the operational parameters fields attached to data maintenance table 520, etc. In an operation 2002, the regularizer process notifies the accountant thread that the connection is complete and that the regularizer process is alive over the connection. In an operation 2004, the regularizer process receives an acknowledgment from the accountant thread.

The regularizer process can serve as a layer of security between the analytic data providers 110 and the accountant threads and/or an instance of SAS® LASR™ Analytic Server. If the regularizer process is a separate process, it can drop unneeded privileges to prevent attacks on the instance of SAS® LASR™ Analytic Server and the main thread of controller 102 in addition to ensuring data conformity when it is received by the accountant threads, minimizing the work the accountant threads and analytic threads perform, thereby simplifying their design. In addition, it provides a safety net, ensuring that invalid operations in semi-trusted incoming data only cause reconnections and retransmissions instead of crashing the instance of SAS® LASR™ Analytic Server and/or the main thread of controller 102.

If a security or software error occurs, the regularizer process may crash, causing existing connections to be severed. The operating system notifies the instance of SAS® LASR™ Analytic Server and/or the main thread of controller 102, which notifies the secretary thread of the crash. The secretary thread restarts the regularizer as though it were starting from the beginning. Once the regularizer is operating again, it notifies the accountant thread, which notifies the secretary thread and data providers 110 begin to connect to the regularizer again.

Data providers 110 are notified by their operating systems that the connection was severed. Data providers 110 attempt to reconnect as though they were also starting again, retransmitting any data once they are again connected. Of course, the data providers 110 may not connect to the same regularizer.

In an operation 2006, the regularizer process sends the presence announcement to the secretary thread. In an operation 2008, the regularizer process receives an acknowledgment from the secretary thread.

In an operation 2010, the regularizer process notifies the accountant thread that it is ready to accept data.

In an operation 2012, the regularizer process receives a connection request from a data provider system. In an operation 2014, the regularizer process sends an acknowledgment to the requesting data provider system. With the acknowledgment, the regularizer process asks for variable information from the requesting data provider system.

In an operation 2016, the regularizer process receives variable information from the requesting data provider system. The variable information may include a variable name and data type such as Integer, Double, String, VarString, etc. These two items are used to match data streaming in with an internal table and to provide an error if there is a discrepancy such as variables with the same name, but different data types.

In an operation 2018, the regularizer process receives data from the requesting data provider system. In an operation 2020, the regularizer process transforms the received data as needed based on the optional transformation information stored in the data structure in data maintenance table 520. In an operation 2020, the regularizer process provides the transformed data to the accountant thread. Processing continues in operation 2018 to continue receiving data until processing is terminated.

The regularizer process may use multiple threads to accept input data from one or more requesting data provider systems. The multiple threads may aggregate the stream(s)

into larger buffers via a dedicated thread. When complete, the aggregated buffers may be provided to the accountant thread using a dedicated thread within the regularizer process using thread synchronization methods such as buffer rings, for example, as described in U.S. patent application Ser. No. 14/218,057, filed Mar. 18, 2014, titled Techniques for Data Retrieval in a Distributed Computing Environment, and assigned to SAS Institute Inc. of Cary, N.C., USA.

Referring to FIG. 21, example operations associated with each of the started analytic threads of stream node 500 are described. Additional, fewer, or different operations may be performed depending on the embodiment. The order of presentation of the operations of FIG. 21 is not intended to be limiting. Although some of the operational flows are presented in sequence, the various operations may be performed in various repetitions, concurrently, and/or in other orders than those that are illustrated. As further understood by a person of skill in the art, various operations may be performed in parallel, for example, using a plurality of analytic threads.

In operation 2100, a determination is made concerning whether or not a command is stored in a command queue. If a command is stored in a command queue, processing continues in an operation 2104. If a command is not stored in a command queue, processing continues in an operation 2102.

In operation 2102, the analytic thread sleeps for a predefined period of time or until a command is available, e.g. using locks with condition variables, events, semaphores, etc., before processing continues in operation 2100 to determine if the command queue now includes a command.

Each block of data blocks 518 needs to be readable by any number of threads simultaneously, but writeable only by one. This can be done using a read-write lock on the block. The accountant thread obtains write access on the block whenever it is modifying a block. The analytic threads obtain read locks. Before obtaining the lock, the analytic threads announce their use or intention to use the block (so that retired or otherwise recycled blocks) can be checked for waiting threads. When entering a block, the analytic threads lock a separate mutual exclusion (mutex) lock and increment a waiting counter. The analytic threads then unlock the mutex and obtain a read lock on the block's read-write lock. When the analytic threads wake up and have the read-write ("Block-wide" lock), the analytic threads perform their operations and unlock the read-write lock. They obtain the waiting counter mutex (blocking if necessary), decrement it by one, and unlock the waiting lock.

Blocks on the free block list may still be in use by the analytic threads. The block is known to be in use by the waiting counter. When obtaining a block from the free block list, the accountant thread walks the list of free blocks and finds the first block with a counter reading zero. The accountant thread obtains the mutex protecting the waiting counter first. It may be possible to use atomic operations (increment, decrement, compare-and-swap) or a semaphore to replace the mutual exclusion lock on the waiting counter.

In operation 2104, the analytic thread selects the command from the command queue. In an operation 2106, the selected command is executed to generate one or more analytic values.

In operation 2108, a determination is made concerning whether or not the analytic task process associated with the selected command should remain loaded. If the analytic task process should remain loaded, processing continues in operation 2100. If the analytic task process should not remain loaded, processing continues in an operation 2110.

For example, the analytic thread checks to see if the instance handle is still present in the hash table of streaming analytic task processes. If the instance handle is not present in the hash table, the analytic task process is no longer loaded.

For example, the analytic task process may be transitioned between two phases: unavailable and unloaded. The analytic task process becomes unavailable when the accountant thread receives a request to stop the analytic task process because there may be commands from the analytic task process in the command queue. The handle is removed from the hash table so that the analytic task process is not available for issuing any more commands, and, if the counter is already zero, RemoveRequest( ) is called. Otherwise, RemoveRequest( ) is called from the thread executing the last command when it completes. If the instance use count is zero because there are no more requests pending, the RemoveRequest( ) caller may also call Destroy( ) to delete the analytic task process environment, or it may keep the analytic task process environment depending on a policy such as to keep the analytic task process environment on a fixed-sized list and call Destroy( ) when it falls off the end of the list.

In operation 2110, the analytic thread decrements the command counter in request hash table 524.

In operation 2112, a determination is made concerning whether or not the command counter is zero. If the command counter is zero, processing continues in an operation 2114. If the command counter is not zero, processing continues in operation 2100.

In operation 2114, the analytic thread calls the Destroy( ) function of the analytic task process and processing continues in operation 2100 until processing is terminated.

Figure 22:
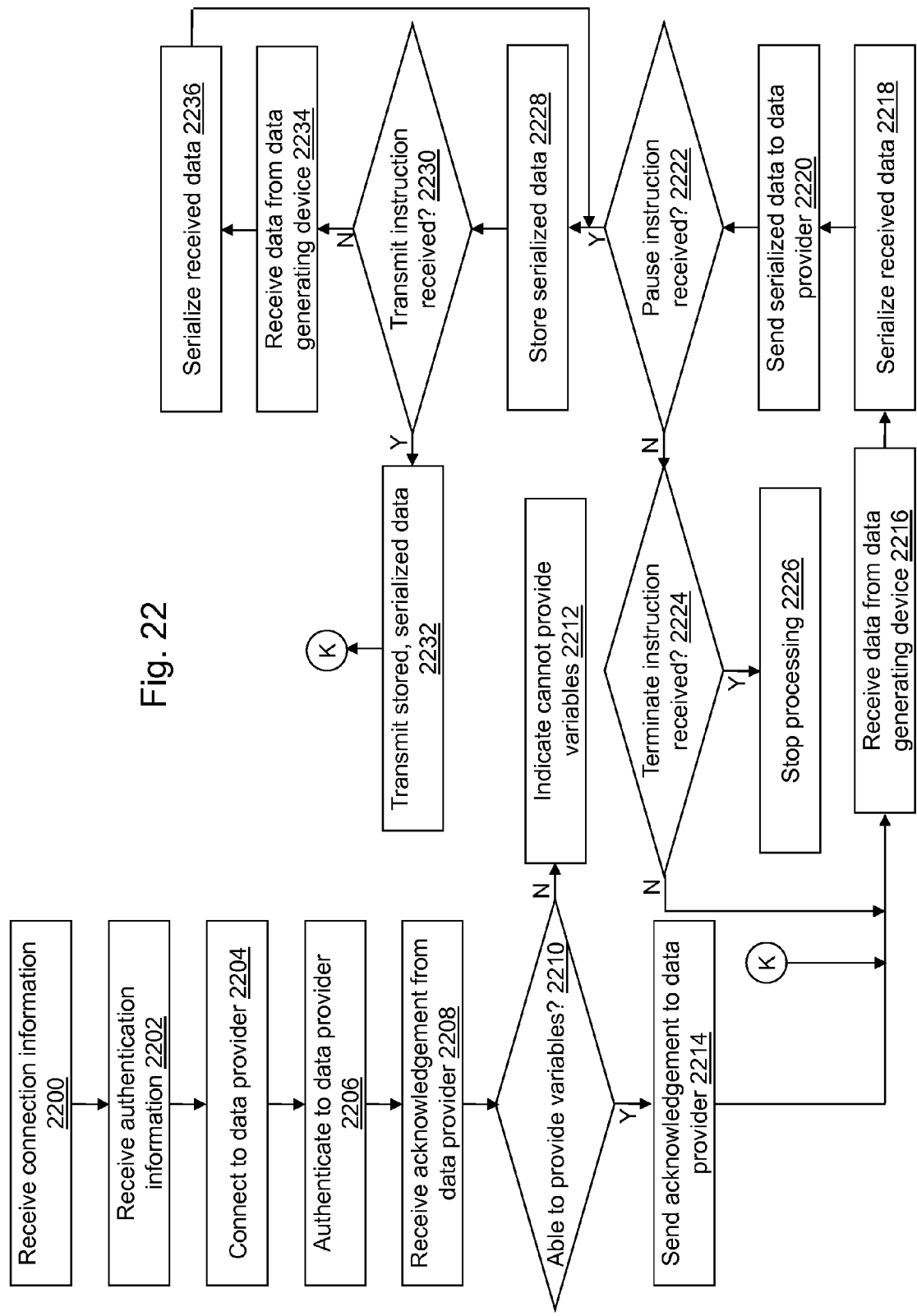
FIG. 22 depicts a flow diagram illustrating examples of operations performed by the data generation device of FIG. 8 in accordance with an illustrative embodiment.

Referring to FIG. 22, example operations associated with data generation application 814 of data generation device 800 are described. Additional, fewer, or different operations may be performed depending on the embodiment. The order of presentation of the operations of FIG. 22 is not intended to be limiting. A user can interact with one or more user interface windows presented to the user in a display at data generation device 800, which triggers different functionality of data generation application 814 executing at data generation device 800. Although some of the operational flows are presented in sequence, the various operations may be performed in various repetitions, concurrently, and/or in other orders than those that are illustrated. As further understood by a person of skill in the art, various operations may be performed in parallel, for example, using a plurality of threads. Data generation application 814 may be executing at each data generation device 800 of data generation system 200. Data generation application 814 executing at each data generation device 800 of data generation system 200 may be based on a type of data generating device 812 connected to or in communication with the associated data generation device 800.

In an operation 2200, connection information is received. In an operation 2202, authentication information is received. For example, the connection and/or authentication information may be received from static configuration files, by remote connection using previously established authentication information to connect to a remote connection information provider, etc. The remote connection information provider information may be received from static configuration files, through run-time parameters such as environment variables or program options, etc.

In an operation 2204, the connection information is used to connect to a data provider system of the plurality of data provider systems 110. In an operation 2206, the authentication information is used to authenticate data generation device 800 to the data provider system of the plurality of data provider systems 110 and vice versa. Data generation device 800 authorizes the data provider system to connect to a particular destination. The authentication can come from public/private keys, a shared secret using challenge/response authentication, password authorization, etc.

In an operation 2208, an acknowledgement is received from the data provider system. With the acknowledgment, data generation device 800 receives variable information from the data provider system. The variable information may include a variable name and data type such as Integer, Double, String, VarString, etc. For example, the variable information may indicate that there is a Purchase Price (integer, in cents), Tax Amount (integer, in Cents), and Customer ID (integer) that is expected to be generated by data generating device 812 or by data generation application 814 using data 816 generated by data generating device 812.

In an operation 2210, a determination is made concerning whether or not data generation device 800 can provide data from data 816 based on the variable information. If data generation device 800 can provide the data, processing continues in an operation 2214. If data generation device 800 cannot provide the data, processing continues in an operation 2212.

In operation 2212, an indicator that data generation device 800 cannot provide the variables is sent to the data provider system. Appropriate correction is made to overcome the discrepancy. In operation 2214, an acknowledgement is sent to the data provider system indicating that data generation device 800 can provide the variables.

In an operation 2216, data is received from data generating device 812, which may be a separate device or integrated with data generation device 800. In an operation 2218, the received data is serialized. In an operation 2220, the serialized data is sent to the data provider system through the connection.

In an operation 2222, a determination is made concerning whether or not a pause instruction is received from the data provider system. If a pause instruction is received, processing continues in an operation 2228. If a pause instruction is not received, processing continues in an operation 2224. For example, if the data provider system becomes overwhelmed, the data provider system may issue a pause instruction.

In operation 2224, a determination is made concerning whether or not a terminate instruction is received from the data provider system. If a terminate instruction is received, processing continues in an operation 2226. If a terminate instruction is not received, processing continues in operation 2216 to continue receiving data from data generating device 812. For example, if the data provider system receives a terminate instruction from controller 102 or a stream node of the plurality of stream nodes, the data provider system may issue a terminate instruction to data generation device 800.

In operation 2226, processing is stopped as discussed further below.

In operation 2228, the serialized data is stored in fourth computer-readable medium 808. For example, the serialized data is queued locally using a linked list.

In operation 2230, a determination is made concerning whether or not a transmit instruction is received from the data provider system. If a transmit instruction is received, processing continues in an operation 2232. If a transmit instruction is not received, processing continues in an operation 2234.

In operation 2232, the stored, serialized data is sent to the data provider system through the connection, and processing continues in operation 2216.

In operation 2234, data is received from data generating device 812. In an operation 2236, the received data is serialized, and processing continues in operation 2228.

Data generation device 800 may use a plurality of threads to gather data from original sources such as sensors, cash register software, etc. The threads gather data and serialize them such as in row-major or column-major order possibly with length specifications. A thread within data generation device 800 obtains serialized source information from the threads via thread synchronization and concatenates them as appropriate into a larger buffer to be sent out. This buffer may be handed over using thread synchronization for example in a manner similar to the buffer rings described in U.S. patent application Ser. No. 14/218,057, filed Mar. 18, 2014, titled Techniques for Data Retrieval in a Distributed Computing Environment, and assigned to SAS Institute Inc. of Cary, N.C., USA. There may be multiple inputs assigned per thread. The threads may poll and/or use blocking methods to read data from the inputs, and aggregate these into bottom-layer buffers.

Figure 23A:
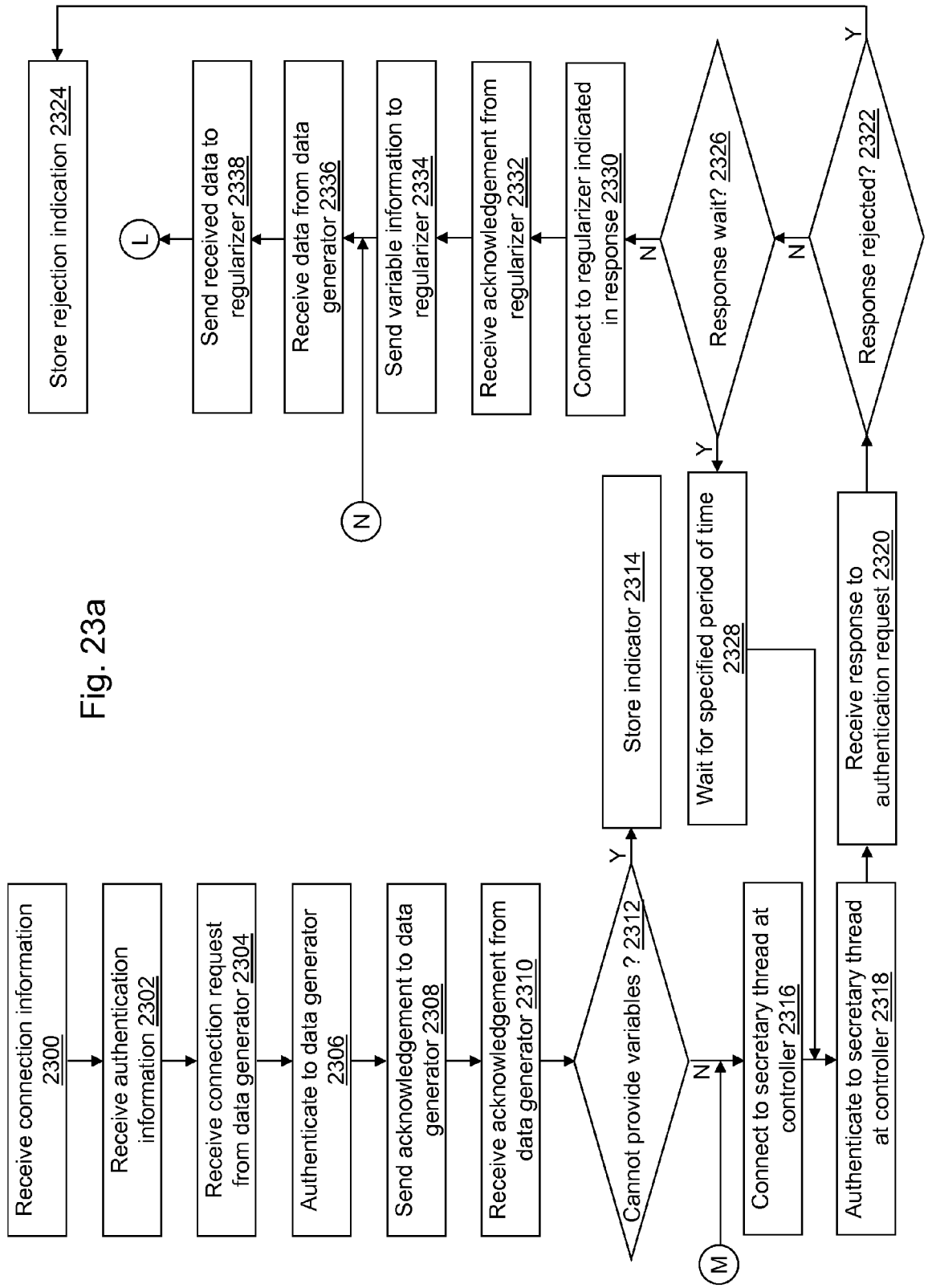
FIGS. 23a and 23b depict a flow diagram illustrating examples of operations performed by the data publishing device of FIG. 9 in accordance with an illustrative embodiment.
Figure 23B:
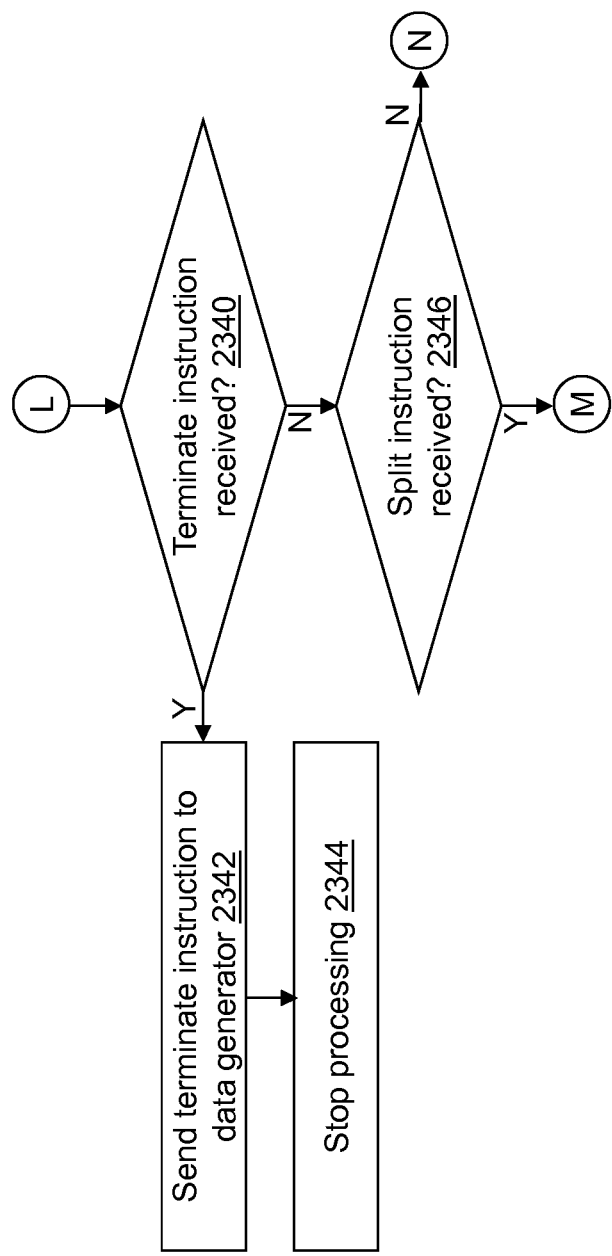

Referring to FIGS. 23*a* and 23*b*, example operations associated with data publishing application 924 of first server computer 126 are described. Additional, fewer, or different operations may be performed depending on the embodiment. The order of presentation of the operations of FIGS. 23*a* and 23*b* is not intended to be limiting. A user can interact with one or more user interface windows presented to the user in display 918, which triggers different functionality of data publishing application 924. Although some of the operational flows are presented in sequence, the various operations may be performed in various repetitions, concurrently, and/or in other orders than those that are illustrated. As further understood by a person of skill in the art, various operations may be performed in parallel, for example, using a plurality of threads. Data publishing application 924 may be executing at each data provider system of data provider systems 110. Data publishing application 924 executing at each data provider system of data provider systems 110 may be based on a type of data generation device 800 connected to or in communication with the associated data provider system.

Referring to FIG. 23*a*, in an operation 2300, connection information is received. In an operation 2302, authentication information is received. For example, the connection and/or authentication information may be received from static configuration files, by remote connection using previously established authentication information to connect to a remote connection information provider, etc. The remote connection information provider information may be received from static configuration files, through run-time parameters such as environment variables or program options, etc.

In an operation 2304, a connection request is received from a data generation device 800 of data generation system 200. In an operation 2306, the authentication information is used to authenticate the data provider system to data generation device 800 and vice versa.

In an operation 2308, an acknowledgement is sent to data generation device 800 of data generation system 200. The acknowledgment includes the variable information request.

In an operation 2310, an acknowledgement is received from data generation device 800 of data generation system 200. In an operation 2312, a determination is made concerning whether or not the received acknowledgement indicates that data generation device 800 cannot provide the variables. If the received acknowledgement indicates that data generation device 800 can provide the variables, processing continues in an operation 2316. If the received acknowledgement indicates that data generation device 800 cannot provide the variables, processing continues in an operation 2314. In operation 2314, an indicator that data generation device 800 cannot provide the variables is stored for example in computer-readable medium 908, is presented on display 918, is printed on printer 920, etc. Appropriate correction is made to overcome the discrepancy.

In an operation 2316, the connection information is used to connect to the secretary thread of controller 102. In an operation 2318, the authentication information is used to authenticate the data provider system to controller 102 and vice versa. The authentication can come from public/private keys, a shared secret using challenge/response authentication, password authorization, etc.

In an operation 2320, a response is received from the secretary thread of controller 102.

In an operation 2322, a determination is made concerning whether or not the received response indicates that the authentication was rejected by the secretary thread of controller 102. If the received response indicates rejection, processing continues in an operation 2324. If the received response does not indicate rejection, processing continues in an operation 2326.

In operation 2324, an indicator that the secretary thread of controller 102 rejects the authentication is stored for example in computer-readable medium 908, is presented on display 918, is printed on printer 920, etc. Appropriate correction is made to overcome the discrepancy.

In operation 2326, a determination is made concerning whether or not the received response indicates that the data provider system wait. If the received response indicates wait, processing continues in an operation 2328. If the received response does not indicate wait, processing continues in an operation 2330.

In operation 2328, the data provider system waits a period of time that may be indicated in the received response, may be defined by a user as a command option, may be stored in computer-readable medium 908 as a default value, etc., and processing continues in operation 2318.

In operation 2330, the data provider system connects to a regularizer process executing at a specific stream node of the plurality of stream nodes. The regularizer process is indicated in the received response.

In an operation 2332, an acknowledgment is received from the regularizer process. In an operation 2334, the variable information is sent to the regularizer process.

In an operation 2336, data is received from data generation device 800 of data generation system 200. In an operation 2338, the received data is sent to a regularizer process. The regularizer process may be selected randomly, using a round-robin policy, etc.

Referring to FIG. 23b, in an operation 2340, a determination is made concerning whether or not a terminate instruction is received from controller 102 or the stream node associated with the regularizer process. If a terminate instruction is received, processing continues in an operation 2342. If a terminate instruction is not received, processing continues in an operation 2346.

In operation 2346, a determination is made concerning whether or not a split instruction is received from controller 102 or the stream node associated with the regularizer process. If a split instruction is received, processing continues in operation 2316 to start negotiating a connection to a new regularizer. If a split instruction is not received, processing continues in operation 2336 to continue receiving data from data generation device 800.

In operation 2342, a terminate instruction is sent to data generation device 800 of data generation system 200. In an operation 2344, processing is stopped as discussed further below.

The data provider system may start a thread or process for each data generation device 800. Similarly to data generation device 800, the input threads may fill buffers and hand them off using thread synchronization methods when partially completed to the concatenation thread, which hands off the filled buffers using thread synchronization methods to the thread or process that sends the filled merged buffers to the regularizer process. As with data generation device 800, described in U.S. patent application Ser. No. 14/218,057, filed Mar. 18, 2014, titled Techniques for Data Retrieval in a Distributed Computing Environment, and assigned to SAS Institute Inc. of Cary, N.C., USA may make communications between the layers very straightforward. There may be multiple data generation devices assigned per thread, and the threads poll and/or use blocking methods to read data from the data generation devices, and aggregate these into the bottom-layer buffers.

Referring again to FIG. 11, in operation 1122, the analytic and/or stream processing is terminated. For example, only the data streaming may continue without further analytics being performed on non-streamed data by the analytic server. To facilitate this capability, the main thread of controller 102 or the instance of SAS® LASR™ Analytic Server, sets a Boolean value to indicate "Deleted" in controller data maintenance table 420 to indicate that analytic processing is stopped on the non-streamed data by the analytic server, but does not delete controller data maintenance table 420. The Boolean value is checked before analytics are performed by the analytic server on the non-streamed data. If "Deleted" is set as the Boolean value, controller data maintenance table 420 is not used though existing streaming analytics continue running. Note that this does not terminate non-streaming analytics supported by the instance of SAS® LASR™ Analytic Server. However, no new non-streaming analytics can run on controller 102.

For example, controller data maintenance table 420 and data maintenance table 520 may be tables currently supported by the instance of SAS® LASR™ Analytic Server supplemented to include the additional data described herein. Regular operations of the instance of SAS® LASR™ Analytic Server may stop (e.g. generating a decision tree with the dtree action), but streaming analytics (such as an adaptive temporal decision tree or adaptive histogram) may continue.

Optionally, stream processing and analytics on the stream may be stopped separately or together. Stopping both the stream and the analytics on the stream may be triggered by a user at the data access system using a command such as StopStream. When streaming stops, any streaming analytics currently running may be unloaded and may be reported back to the user as information at the end of the StopStream action, as if the user had requested termination (e.g., the destructor for the analytic is called). For example, the user may have requested that the streaming stop, but may not have deleted a table for regular analytics supported by the instance of SAS® LASR™ Analytic Server. If "Deleted" is set in controller data maintenance table 420, controller data maintenance table 420 is deleted, and this occurrence may be reported back at the end of the StopStream action so that the data access system can remove data as needed.

After the analytics are stopped, the main thread of controller 102 may notify the accountant threads and the secretary thread to terminate. The secretary thread may move to a termination state until notified by the main thread of controller 102 that termination is complete. New connection attempts may be rejected.

The accountant threads notify the regularizer processes to terminate their connections and exit. The accountant threads may place a set of terminate commands in the command queue, one for each thread in the thread pool. The threads in the thread pool receive the terminate command and exit.

The regularizer processes send the data provider systems 110 terminate instructions, which the data provider systems 110 acknowledge (a timeout may expire before all of the data provider systems 110 acknowledge the terminate instructions, in which case any further communications with the data provider systems 110 may return a bad request instruction. If a data provider system of the data provider systems 110 initiates a new connection with the secretary thread, it may receive a terminate instruction.

Similarly, the data provider systems 110 notify the data generation devices of data generation system 200. In the event of a regular or timeout-derived connection attempt, the data provider systems 110 reply to all requests with terminate until all data generation devices have timed out or Acknowledged at which point the data provider system exits. The data generation devices of data generation system 200 exit as soon as they acknowledge the terminate order.

The regularizer processes exit when the data provider systems 110 have all acknowledged or timed out. The accountant threads notify the main thread of controller 102 that they are closing down and terminate any remaining threads. The main thread of controller 102 notifies the secretary thread to exit when all of the accountant threads have exited. The main thread of controller 102 sends final information above to the data access system and exits. The analytic server removes the controller data maintenance table 420 when the main thread of controller 102 exits.

Controller device 102 and the plurality of stream nodes 106 provide streaming analytics, in concert with existing, conventional analytics, for example, using the instance of SAS® LASR™ Analytic Server without requiring that the analytics be modified for streaming data. The conventional analytics are run on data blocks within the retirement window as follows.

As data is retired from blocks, the beginning-of-block information that the instance of SAS® LASR™ Analytic Server looks for is updated to reflect the start of the in-window data. Similarly, data which is arriving into the window is appended and the end-of-block information is also updated. The block list itself is also updated as the entire block falls into and out of the retirement window.

Conventional analytics obtain a read lock on the blocks in the list sequentially as they traverse the list and begin processing the data using the beginning- and end-of-data information. Thus, they only look at a snapshot of the data as it flows through the retirement window. Through maintenance of the retirement window and beginning- and end-of-data information, controller device 102 and the plurality of stream nodes 106 allow for windowed conventional analytics without requiring modification of the analytic methods, allowing use of existing analytics on snapshots of the streaming data.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   start a regularizer process by a first thread executing at the computing device,
   wherein the regularizer process is a separate process from a process executing on the first thread;
   wherein the started regularizer process
      sends a presence announcement to a controller device,
         wherein the presence announcement includes an indicator of the computing device,
         wherein the controller device controls distribution of analytic results to a data access system,
         wherein the analytic results are computed from streamed data;
      receives a presence acknowledgement from the controller device in response to sending the presence announcement;
      sends a notification to the first thread executing at the computing device that the started regularizer process is ready to receive the streamed data after receiving the presence acknowledgement;
      receives, from the controller device, an indicator of a data provider system that is to connect to the started regularizer process after sending the notification;
      receives a connection request from the data provider system;
      compares the received connection request to the received indicator;
      sends a connection acknowledgement to the data provider system when the received connection request matches the received indicator;
      accepts a connection from the data provider system; and
      receives the streamed data through the connection.

2. The non-transitory computer-readable medium of claim 1, wherein the regularizer process executes in a secure computing mode.

3. The non-transitory computer-readable medium of claim 1, wherein the regularizer process has fewer operating privileges than the process executing on the first thread.

4. The non-transitory computer-readable medium of claim 1, wherein the received indicator includes authentication information to prove the data provider system was authenticated by the controller device.

5. The non-transitory computer-readable medium of claim 1, wherein the received connection request is directly to an inbound port of the computing device.

6. The non-transitory computer-readable medium of claim 1, wherein the notification sent to the first thread uses an internal transmission control protocol port.

7. The non-transitory computer-readable medium of claim 1, wherein the notification sent to the first thread uses an identifier of the started regularizer process and a connection socket.

8. The non-transitory computer-readable medium of claim 1, wherein the notification sent to the first thread uses a shared memory.

9. The non-transitory computer-readable medium of claim 1, wherein, before sending the presence announcement, the started regularizer process opens an inbound port of the computing device.

10. The non-transitory computer-readable medium of claim 9, wherein the inbound port is identified in a communication from the first thread.

11. The non-transitory computer-readable medium of claim 1, wherein, after sending the connection acknowledgement, the started regularizer process:
receives, from the controller device, a second indicator of a second data provider system that is to connect to the started regularizer process;
receives a second connection request from the second data provider system;
compares the received second connection request to the received second indicator;
sends a second connection acknowledgement to the second data provider system when the received second connection request matches the received second indicator; and
accepts a second connection from the second data provider system, wherein the connection and the second connection exist at the same time; and
receives second streamed data through the second connection.

12. The non-transitory computer-readable medium of claim 11, wherein the analytic results are further computed from the received second streamed data.

13. The non-transitory computer-readable medium of claim 11, wherein separate analytic results are computed from the received second streamed data.

14. The non-transitory computer-readable medium of claim 1, wherein the connection acknowledgement includes a variable request requesting variable information from the data provider system.

15. The non-transitory computer-readable medium of claim 14, wherein, after sending the connection acknowledgement and before accepting the connection, the started regularizer process:
receives the variable information from the data provider system, wherein the variable information describes the streamed data with a variable name and a data type associated with the variable name for one or more variables; and
compares the received variable information to one or more expected variables included in a table, wherein the connection is accepted when the received variable information agrees with the one or more expected variables included in the table.

16. The non-transitory computer-readable medium of claim 15, wherein the started regularizer process sends an error indicator to the data provider system and the connection to the data provider system is not accepted when the received variable information does not agree with the one or more expected variables included in the table.

17. The non-transitory computer-readable medium of claim 1, wherein, the started regularizer process further:
transforms the received streamed data based on transformation information defined for one or more variables included in the received streamed data; and
sends the transformed streamed data to the first thread.

18. The non-transitory computer-readable medium of claim 17, wherein transforming the received streamed data includes constraining a variable of the one or more variables to a value.

19. The non-transitory computer-readable medium of claim 17, wherein transforming the received streamed data includes applying a mathematical operation to data associated with a variable of the one or more variables.

20. The non-transitory computer-readable medium of claim 1, wherein the started regularizer process further sends the received streamed data to the first thread.

21. The non-transitory computer-readable medium of claim 1, wherein, after receiving the streamed data, the started regularizer process sends a split request to the data provider system requesting that the data provider system lower a data rate of the streamed data.

22. The non-transitory computer-readable medium of claim 21, wherein, after sending the split request, the started regularizer process further disconnects the accepted connection when the data provider system does not lower the data rate of the streamed data.

23. A system comprising:
a first computing device comprising
a first processor; and
a first non-transitory computer-readable medium operably coupled to the first processor, the first computer-readable medium having first computer-readable instructions stored thereon that, when executed by the first processor, cause the first computing device to
start a regularizer process by a first thread executing at the first computing device,
wherein the regularizer process is a separate process from a process executing on the first thread;
wherein the started regularizer process
sends a presence announcement to a controller device,
wherein the presence announcement includes an indicator of the computing device,
wherein the controller device controls distribution of analytic results to a data access system,
wherein the analytic results are computed from streamed data;
receives a presence acknowledgement from the controller device in response to sending the presence announcement;
sends a notification to the first thread executing at the computing device that the started regularizer process is ready to receive the streamed data after receiving the presence acknowledgement;
receives, from the controller device, an indicator of a data provider system that is to connect to the started regularizer process after sending the notification;
receives a connection request from the data provider system;

compares the received connection request to the received indicator;

sends a connection acknowledgement to the data provider system when the received connection request matches the received indicator;

accepts a connection from the data provider system; and receives the streamed data through the connection.

24. The system of claim 23, wherein the connection acknowledgement includes a variable request requesting variable information from the data provider system.

25. The system of claim 23, further comprising the controller device, wherein the controller device comprises:
a second processor; and
a second non-transitory computer-readable medium operably coupled to the second processor, the second computer-readable medium having second computer-readable instructions stored thereon that, when executed by the second processor, cause the controller device to
receive the presence announcement from the first computing device;
send the presence acknowledgement to the first computing device in response to receiving the presence announcement;
receive a first connection request from the data provider system that includes authentication information for the data provider system;
authenticate the data provider system;
after authenticating the data provider system, select the first computing device from a plurality of computing devices to connect with the data provider system; and
send the indicator of the data provider system to the first computing device.

26. The system of claim 25, wherein the first computing device is selected based on a number of blocks of streamed data stored at each of the plurality of computing devices.

27. The system of claim 25, wherein the second computer-readable instructions further cause the controller device to send a second indicator of the first computing device to the data provider system.

28. The system of claim 25, wherein the second computer-readable instructions further cause the controller device to:
receive a second connection request from a second data provider system that includes second authentication information for the second data provider system;
authenticate the second data provider system;
after authenticating the second data provider system, select the first computing device from the plurality of computing devices to connect with the second data provider system; and
send a second indicator of the second data provider system to the first computing device.

29. The system of claim 25, wherein the second computer-readable instructions further cause the controller device to:
after authenticating the data provider system, select a second computing device from the plurality of computing devices to connect with the data provider system to receive a portion of the streamed data; and
send the indicator of the data provider system to the second computing device.

30. A method of distributed stream processing, the method comprising:
starting a regularizer process by a first thread executing at a computing device,
wherein the regularizer process is a separate process from a process executing on the first thread;
wherein the started regularizer process
sends a presence announcement to a controller device,
wherein the presence announcement includes an indicator of the computing device,
wherein the controller device controls distribution of analytic results to a data access system,
wherein the analytic results are computed from streamed data;
receives a presence acknowledgement from the controller device in response to sending the presence announcement;
sends a notification to the first thread executing at the computing device that the started regularizer process is ready to receive the streamed data after receiving the presence acknowledgement;
receives, from the controller device, an indicator of a data provider system that is to connect to the started regularizer process after sending the notification;
receives a connection request from the data provider system;
compares the received connection request to the received indicator;
sends a connection acknowledgement to the data provider system when the received connection request matches the received indicator;
accepts a connection from the data provider system; and
receives the streamed data through the connection.

* * * * *